(12) United States Patent
Hussein

(10) Patent No.: US 7,327,181 B2
(45) Date of Patent: Feb. 5, 2008

(54) MULTIPLE PHASE SIMULTANEOUS SWITCHING PREVENTING CIRCUIT, PWM INVERTER AND ITS DRIVING METHOD

(75) Inventor: Khalid Hassan Hussein, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 237 days.

(21) Appl. No.: 10/558,688

(22) PCT Filed: Feb. 19, 2004

(86) PCT No.: PCT/JP2004/001863

§ 371 (c)(1),
(2), (4) Date: Nov. 30, 2005

(87) PCT Pub. No.: WO2005/081389

PCT Pub. Date: Sep. 1, 2005

(65) Prior Publication Data

US 2006/0250728 A1 Nov. 9, 2006

(51) Int. Cl.
*H03K 3/00* (2006.01)
(52) U.S. Cl. ...................... 327/296; 327/396
(58) Field of Classification Search ............... None
See application file for complete search history.

(56) References Cited

U.S. PATENT DOCUMENTS

| 4,719,365 | A | * | 1/1988 | Misono | 327/154 |
| 5,777,500 | A | * | 7/1998 | Eitrheim | 327/174 |
| 6,384,660 | B1 | * | 5/2002 | Hikima | 327/296 |

FOREIGN PATENT DOCUMENTS

| JP | 01-202173 | 8/1989 |
| JP | 04-069782 | 3/1992 |
| JP | 07-298633 | 11/1995 |
| JP | 2002-199788 | 7/2002 |

\* cited by examiner

*Primary Examiner*—Kenneth B. Wells
*Assistant Examiner*—An T. Luu
(74) *Attorney, Agent, or Firm*—Oblon, Spivak, McClelland, Maier & Neustadt, P.C.

(57) ABSTRACT

A PWM inverter in which high-surge voltage is not applied across terminals of a switching device thereof is provided by preventing multi-phase simultaneous switching. A multi-phase simultaneous-switching prevention circuit (100) that includes: a plurality of input means each for taking in, as an input signal, one of multi-phase control signals outputted from a PWM signal generating circuit; blocking pulse generating means each for generating a blocking pulse, for a predetermined period, in synch with the rising or the falling of the input signal of one phase, in order to block the rising or the falling of the input signals of the other phases; blocking signal forming means each for outputting a blocking signal whose blocking period is made to be the width of a pulse formed by the logical sum of a plurality of the other-phase blocking pulses from the blocking pulse generating means; signal blocking means each for receiving the input signal of the one phase, and outputting a signal whose rising or falling is delayed until the end of the blocking period; and a plurality of output means each for outputting to the exterior of the prevention circuit the output signal from the signal blocking means, is inserted across a gate driving circuit (3), and a three-phase PWM signal generating circuit (1).

19 Claims, 16 Drawing Sheets

Fig.2
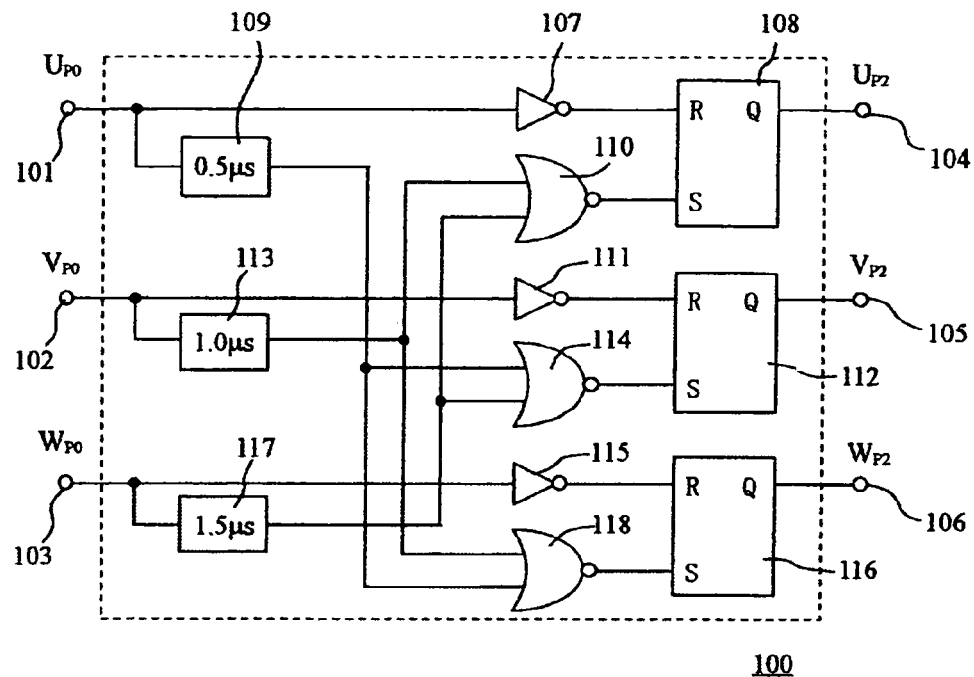
Fig.3
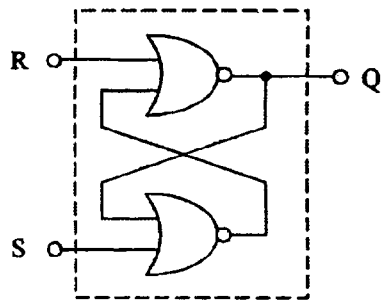
Fig.4
| S | R | Qn+1 |
|---|---|------|
| L | L | Qn   |
| H | L | H    |
| L | H | L    |
| H | H | L    |

US 7,327,181 B2

MULTIPLE PHASE SIMULTANEOUS SWITCHING PREVENTING CIRCUIT, PWM INVERTER AND ITS DRIVING METHOD

TECHNICAL FIELD

The present invention relates to inverters for converting dc electric power to ac electric power by pulse-width-modulated (PWM) signals, and especially relates to inverters having circuits or functions for preventing multi-phase simultaneous-switching.

BACKGROUND ART

Hereinafter, a configurational example of a conventional three-phase PWM inverter is explained referring to figures.

A circuit block diagram that illustrates a configuration of the three-phase PWM inverter for drive-controlling a conventional three-phase ac motor is represented inside broken lines in FIG. 20 (for example, refer to pages 2-3, and FIG. 4 in Japanese Laid-Open Patent Publication 298,633/1995). It is well known that a three-phase ac motor has three phases referred to as a U-phase, V-phase, and W-phase. When driving these three phases by an inverter device, a control circuit controls their operations by outputting respective PWM signals for each phase. A three-phase PWM-signal generating circuit 1 outputs PWM signals based on a reference frequency and effective voltage of a three-phase ac voltage waveform (PWM waveform) supplied into a motor 2; thus, each of the outputted signals is transmitted to six gate drive circuits 3a, 3b, 3c, 3d, 3e, and 3f, and the output is also connected to each gate terminal of six insulated gate bipolar transistors (hereinafter referred to as IGBTs) 4a, 4b, 4c, 4d, 4e, and 4f that are a switching device. Each of six diodes 5a, 5b, 5c, 5d, 5e, and 5f is connected in antiparallel to each IGBT. A main power supply 6 is a dc source for supplying electric power to the motor 2, being practically approximately 140 V dc power rectified and then smoothed from 100 V ac power, or 280 V dc power rectified and then smoothed from 200 V ac power, is generally used; however, the main power supply is simply represented by a battery symbol in the figure. A capacitor 7 is connected in parallel to the main power supply 6. The collector terminals of the high-side IGBTs 4a, 4b, and 4c are connected to the positive-electrode-side terminal of the main power supply 6, meanwhile the emitter terminals of the low-side IGBTs 4d, 4e, and 4f are connected to the negative-electrode-side terminal of the main power supply 6. Moreover, the emitter terminal of the IGBT 4a is connected to the collector terminal of the IGBT 4d, and an output terminal U is wired for connecting the connecting point with the motor 2. Similarly, the emitter terminal of the IGBT 4b is connected to the collector terminal of the IGBT 4e, and an output terminal V is wired for connecting the connecting point with the motor 2; moreover, the emitter terminal of the IGBT 4c is connected to the collector terminal of the IGBT 4f, and an output terminal W is wired for connecting the connecting point with the motor 2.

An operation of a three-phase PWM inverter configured such as that is explained using FIG. 21. FIG. 21 is a signal-waveform representing the operation of the three-phase PWM-signal generating circuit 1. The three-phase PWM-signal generating circuit 1 creates modulated signals EU, EV, and EW that are three-phase sine waves in which the phase has been shifted 120 degrees each other; then, generates PWM signals $U_{PO}$, $V_{PO}$, $W_{PO}$, $U_{NO}$, $V_{NO}$, and $W_{NO}$ (only PWM signals $U_{PO}$, $V_{PO}$, and $W_{PO}$ are represented in FIG. 21) that are transmitted into the gate drive circuits 3a, 3b, 3c, 3d, 3e, and 3f, respectively, after comparing the modulated signals to an triangular carrier signal EC. Here, the PWM signals $U_{PO}$, $V_{PO}$, and $W_{PO}$ for driving the high side, and the PWM signals $U_{NO}$, $V_{NO}$, and $W_{NO}$ for driving the low side are in a relationship of logical inversion, respectively; thereby, on/off operations are alternately performed by each of the high-side IGBTs 4a, 4b, and 4c, and the corresponding low-side IGBT among 4d, 4e, and 4f. Thereby, the output terminals U, V, and W are alternately switched to the positive-electrode terminal and the negative-electrode terminal of the main power supply 6; then, the motor 2 connected to the terminals is driven. Practically, because the PWM signals $U_{PO}$, $V_{PO}$, and $W_{PO}$ for driving the high side, and the PWM signals $U_{NO}$, $V_{NO}$, and $W_{NO}$ for driving the low side are not in a relationship of simple logical inversion, in order to prevent load-short-circuiting caused by those upper and lower arms simultaneously coming into on-state in a transient period of the switching operation, a deadline is usually provided; however, the discussion is omitted here, because this matter is not concerned with the essence of the present invention.

DISCLOSURE OF THE INVENTION

An operation of the above-described three-phase inverter is explained in further detail. The three-phase PWM signal generating circuit 1 generates a PWM signal by comparing the relatively high-frequency carrier signal EC with the relatively low-frequency modulated signals EU, EV, and EW each representing a needed wave form for each phase. Specifically, if the magnitude of any modulated signal is larger than that of the carrier signal, a PWM signal, in which the high-side IGBT of a phase corresponding to the modulated signal becomes switched on, while the low-side IGBT of the phase becomes switched off, is outputted from the three-phase PWM signal generating circuit 1. In a case in which the carrier signal is triangular, as represented in FIG. 21, a moment exists in which the falling of the carrier wave is matched with the cross point between two modulated signals. In such cases, two high-side IGBTs of phases corresponding to the matched modulated signal simultaneously switch on, and surging current is induced; as a result, high surge voltage is supplied between the terminals of the IGBT. This phenomenon is especially applicable to a case in which two IGBTs simultaneously switch on during the corresponding diodes of arms on the opposite side being in a freewheeling mode. Moreover, this phenomenon can also be explained referring to FIG. 22. FIG. 22 represents a tendency that the absolute value of the current-varying rate (di/dt) of the freewheeling diode in a reverse recovery mode increases in accordance with its current decreasing. FIG. 22 means that the absolute value of the total variation rates of two simultaneous reverse recovery currents due to the entire current carried by two switching IGBTs becomes larger than the absolute value of the variation rate of reverse recovery current due to the same amount of the entire current as carried by one IGBT. In a case in which the carrier signal is sawtooth, as represented in FIG. 23, a moment also exists in which the falling of the carrier wave coincides with the cross point of three modulated signals. In such cases, three-phase IGBTs simultaneously switch on.

An objective of the present invention, which is made to solve a problem as described above, is to provide a PWM inverter in which high surge voltage is not applied between the terminals of the switching device thereof, by preventing multi-phase simultaneous switching.

In order to achieve the above objective, according to a first aspect of the present invention, a multi-phase simultaneous-switching prevention circuit includes: a plurality of input means each for taking in, as an input signal, one of multi-phase control signals outputted from a PWM signal generating circuit; blocking pulse generating means each for generating a blocking pulse, for a predetermined period, in synch with the rising or the falling of the input signal of one phase, in order to block the rising or the falling of the input signals of the other phases; blocking signal forming means each for outputting a blocking signal whose blocking period is made to be the width of a pulse formed by the OR of a plurality of the other-phase blocking pulses from the blocking pulse generating means; signal blocking means each for receiving the input signal of the one phase, and outputting a signal whose rising or falling is delayed until the end of the blocking period; and a plurality of output means each for outputting to the exterior of the prevention circuit the output signal from the signal blocking means.

In order to achieve the above objective, according to a second aspect of the present invention, a multi-phase simultaneous-switching prevention circuit includes: a plurality of input means each for taking in, as an input signal, one of multi-phase control signals outputted from a PWM signal generating circuit; simultaneous-switching detection means each for detecting that an input signal of one phase and input signals of the other phases simultaneously rise or fall during a predetermined forbidden period, and for outputting the detection signal; blocking signal generating means each for receiving the detection signal from the simultaneous-switching detection means, and outputting a blocking signal having a predetermined blocking period; signal blocking means each for receiving the input signal of the one phase; outputting a signal whose rising or falling is delayed by the amount of the blocking period; and a plurality of output means each for outputting to the exterior of the prevention circuit the output signal from the signal blocking means.

Because the above configuration has been taken, surge voltage, applied between the terminals of the switching device, which generates as a result of a switching operation of the switching device can be reduced, and switching loss that is the product of the switching voltage including the surge voltage, and the switching current can also be reduced.

BRIEF DESCRIPTION OF DRAWINGS

FIG. 2 is a circuit diagram illustrating a simultaneous-switching prevention circuit of Example 1 in Embodiment 1 according to the present invention;

FIG. 3 is a circuit diagram illustrating an example of a latch circuit;

FIG. 4 is the truth table for the latch circuit;

BEST MODE FOR CARRYING OUT THE INVENTION

Embodiment 1

Figure 1:
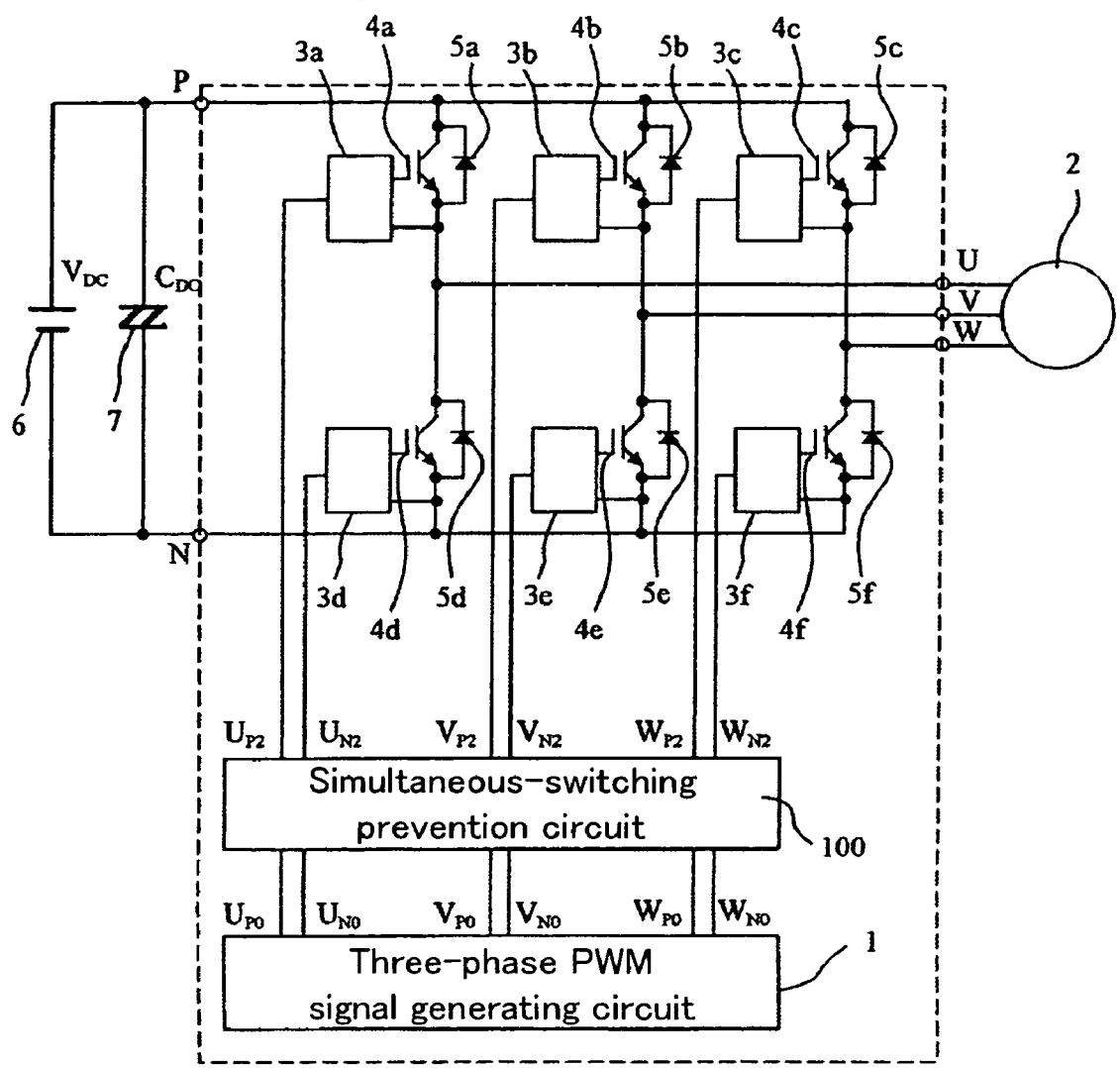
FIG. 1 is a circuit block diagram illustrating a configuration of a PWM inverter in Embodiment 1 or 2 according to the present invention.
Figure 20:
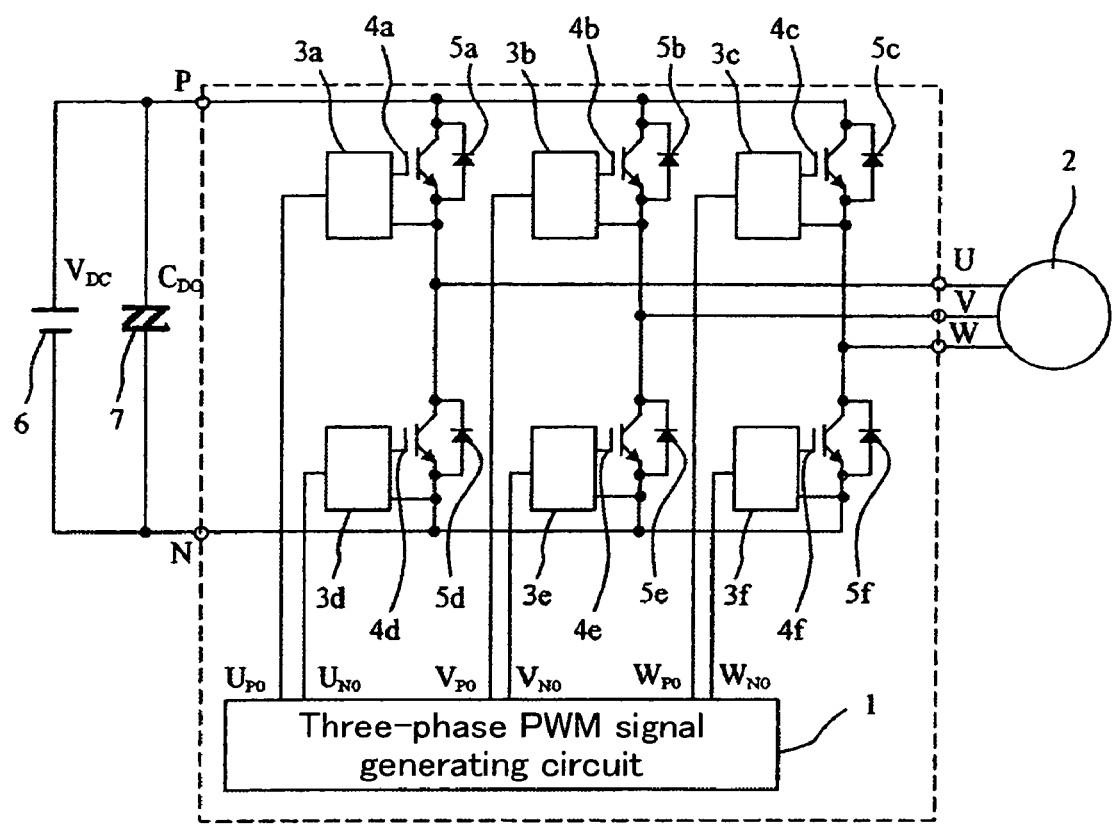
FIG. 20 is a circuit block diagram illustrating a configuration of a conventional PWM inverter.
Figure 21:
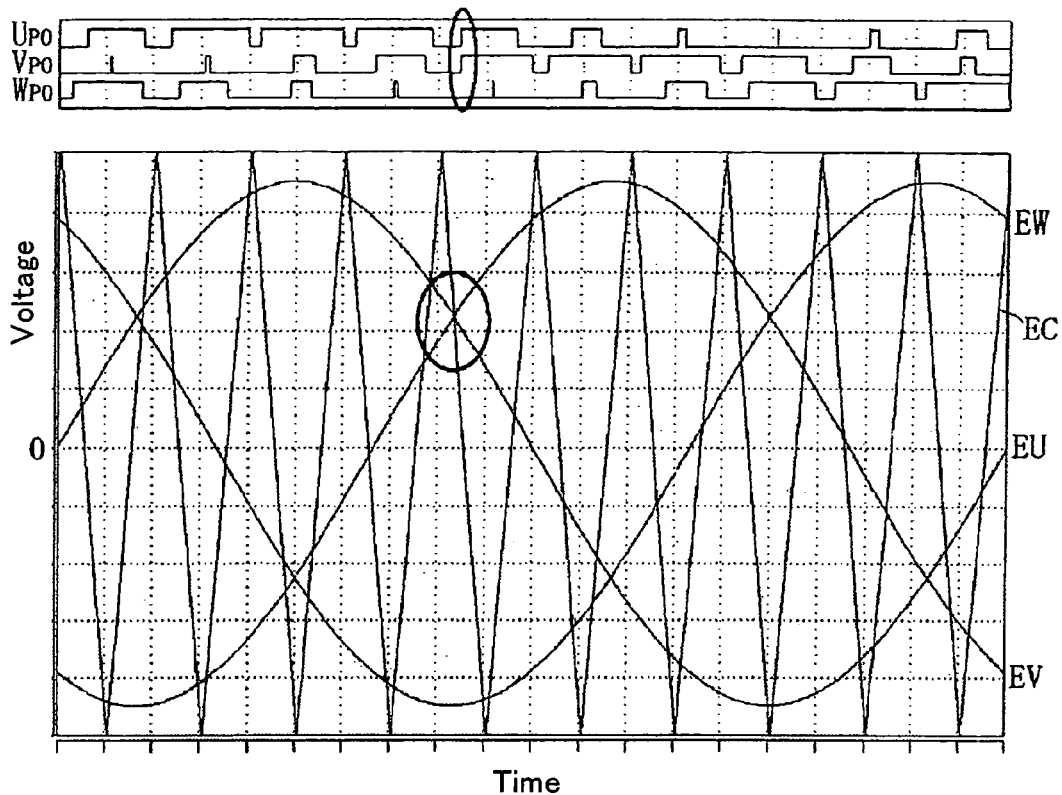
FIG. 21 is signal-wave-form views representing an operation of a three-phase PWM signal generating circuit using a triangular carrier wave.
Figure 22:
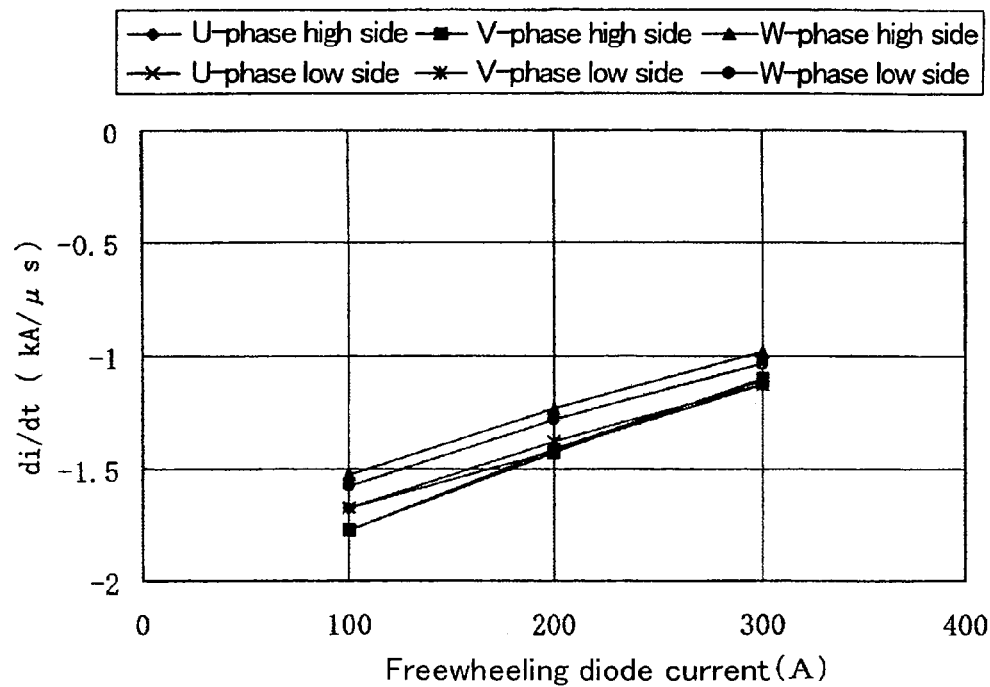
FIG. 22 is a graph representing relationships between current-varying rates and current in the reverse recovery mode of a freewheeling diode.
Figure 23:
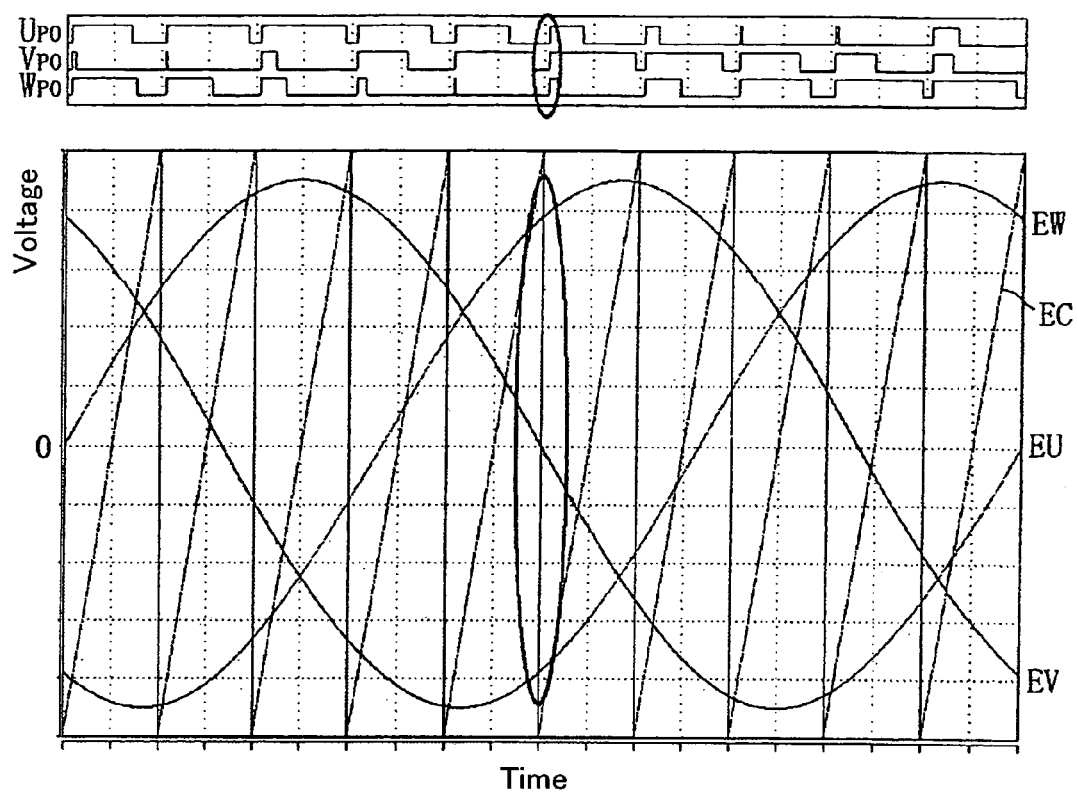
FIG. 23 is signal-wave-form views representing an operation of a three-phase PWM signal generating circuit using a sawtooth carrier wave.

Hereinafter, a PWM inverter in Example 1 included in Embodiment 1 according to the present invention is explained referring to figures. A circuit block diagram illustrated inside broken lines in FIG. 1 represents a configuration of a three-phase PWM inverter of Example 1 included in Embodiment 1 according to the present invention, which is approximately the same as that of the conventional PWM inverter in FIG. 20; however it differs from the conventional one on the point that a simultaneous-switching prevention circuit 100 is inserted between the gate drive circuits 3*a*, 3*b*, 3*c*, 3*d*, 3*e* and 3*f*, and the three-phase PWM-signal generating circuit 1. Here, a carrier signal waveform in the three-phase PWM-signal generating circuit 1 is triangular. FIG. 2 is a circuit block diagram illustrating an internal configuration of the simultaneous-switching prevention circuit 100, which is provided, as an interface to an external circuit, with an input means composed of a U-phase high-side input terminal 101 that receives a high-side PWM signal $U_{P0}$ from the three-phase PWM-signal generating circuit 1, a V-phase high-side input terminal 102 that receives a high-side PWM signal $V_{P0}$ from the three-phase PWM-signal generating circuit 1, and a W-phase high-side input terminal 103 that receives a high-side PWM signal $W_{P0}$ from the three-phase PWM-signal generating circuit 1, and an output means composed of a U-phase high-side output terminal 104 that transmits an output signal $U_{P2}$ into the gate drive circuit 3a, a V-phase high-side output terminal 105 that transmits an output signal $V_{P2}$ into the gate drive circuit 3b, and a W-phase high-side output terminal 106 that transmits an output signal $W_{P2}$ into the gate drive circuit 3c. In this simultaneous-switching prevention circuit 100, PWM signals of each phase, having been received from the three-phase PWM-signal generating circuit. 1, is processed in order to prevent the simultaneous switching operation, and then the processed signals are transmitted to respective gate drive circuits of the phases.

In the circuit illustrated in FIG. 2, a portion taking part in the high-side U-phase signal processing is composed of a U-phase NOT circuit 107 arid a U-phase latch circuit 108 as a U-phase-signal blocking means, a U-phase one-shot-pulse generating circuit 109 as a U-phase blocking-pulse generating means, and a U-phase NOR circuit 110 as a U-phase blocking-signal creating means. A line from the U-phase high-side input terminal 101 branches into two lines on the way, one of which is connected to the U-phase NOT circuit 107, while the other is connected to the U-phase one-shot-pulse generating circuit 109. Similarly, a portion taking part in the high-side V-phase signal processing is composed of a V-phase NOT circuit 111 and a V-phase latch circuit 112 as a V-phase-signal blocking means, a V-phase one-shot-pulse generating circuit 113 as a V-phase blocking-pulse generating means, and a V-phase NOR circuit 114 as a V-phase blocking-signal creating means; moreover, a portion related to the high-side W-phase signal processing is composed of a W-phase NOT circuit 115 and a W-phase latch circuit 116 as a W-phase-signal blocking means, a W-phase one-shot-pulse generating circuit 117 as a W-phase blocking-pulse generating means, and a W-phase NOR circuit 118 as a W-phase blocking-signal creating means.

A line from the U-phase high-side input terminal 101 branches into two lines on the way, and one of which is connected to the input of the U-phase one-shot-pulse generating circuit 109, while the other is connected to the input of the U-phase NOT circuit 107. A line from the output of the U-phase one-shot-pulse generating circuit 109 branches into two lines on the way, and one of which is connected to the input of the V-phase NOR circuit 114, while the other is connected to the input of the W-phase NOR circuit 118. A line from the V-phase high-side input terminal 102 branches into two lines on the way, and one of which is connected to the input of the V-phase one-shot-pulse generating circuit 113, while the other is connected to the input of the V-phase NOT circuit 111. A line from the output of the V-phase one-shot-pulse generating circuit 113 branches into two lines on the way, and one of which is connected to the input of the U-phase NOR circuit 110, while the other is connected to the input of the W-phase NOR circuit 118. A line from the W-phase high-side input terminal 103 branches into two lines on the way, and one of which is connected to the input of the W-phase one-shot-pulse generating circuit 117, while the other is connected to the input of the W-phase NOT circuit 115. A line from the output of the W-phase one-shot-pulse generating circuit 117 branches into two lines on the way, and one of which is connected to the input of the U-phase NOR circuit 110, while the other is connected to the input of the V-phase NOR circuit 114. A line from the output of the U-phase NOT circuit 107 is connected to an R-terminal of the U-phase latch circuit 108, a line from the output of the U-phase NOR circuit 110 is connected to an S-terminal of the U-phase latch circuit 108, and a line from a Q-terminal of the U-phase latch circuit 108 is connected to the U-phase high-side output terminal 104. A line from the output of the V-phase NOT circuit 111 is connected to an R-terminal of the V-phase latch circuit 112, a line from the output of the V-phase NOR circuit 114 is connected to an S-terminal of the V-phase latch circuit 112, and a line from a Q-terminal of the V-phase latch circuit 112 is connected to the V-phase high-side output terminal 105. A line from the output of the W-phase NOT circuit 115 is connected to an R-terminal of the W-phase latch circuit 116, a line from the output of the W-phase NOR circuit 118 is connected to an S-terminal of the W-phase latch circuit 116, and a line from a Q-terminal of the W-phase latch circuit 116 is connected to the W-phase high-side output terminal 106. Only a high-side simultaneous-switching prevention circuit is illustrated in FIG. 2. Although a similar simultaneous-switching prevention circuit is provided on the low side, because the circuit configuration becomes the same as that configuration, the drawing is omitted. Here, each of the latch circuits is a circuit, for example, as illustrated in FIG. 3, which operates according to the truth table represented in FIG. 4.

Figure 5:
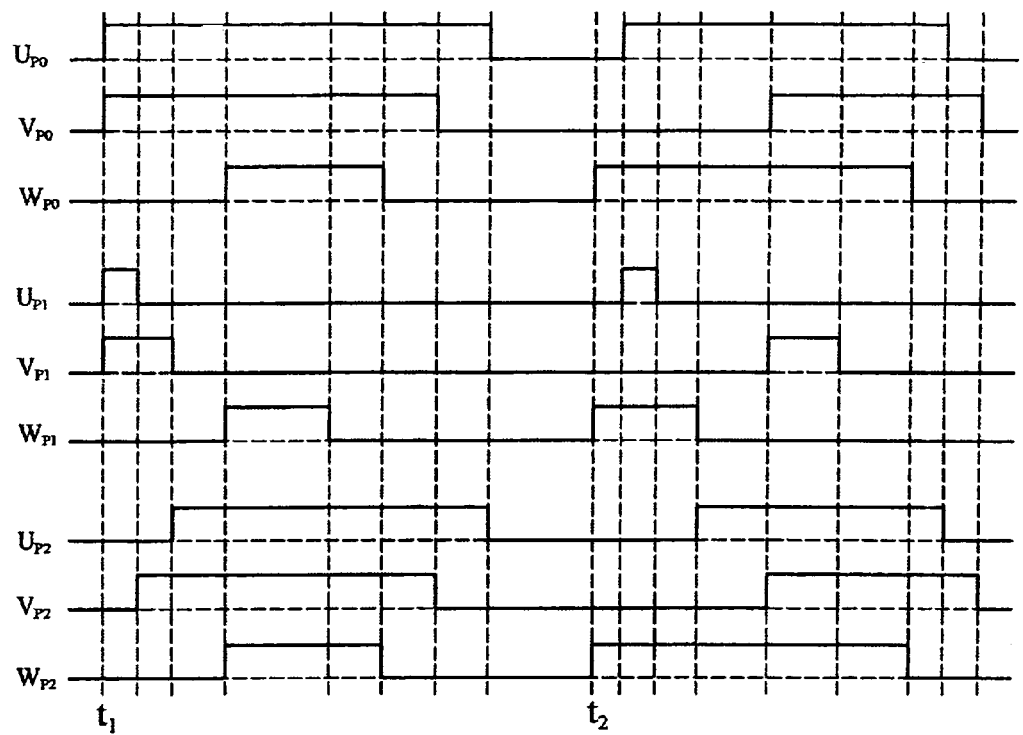
FIG. 5 is a timing chart representing an operation of the simultaneous-switching prevention circuit of Example 1 in Embodiment 1 according to the present invention.

By the simultaneous-switching prevention circuit configured as described above, two-phase simultaneous switching is prevented; then, the operation is explained using FIG. 5. FIG. 5 is a timing chart representing an operation of the simultaneous-switching prevention circuit of Example 1 included in Embodiment 1 according to the present invention. The U-phase PWM signal $U_{P0}$, the V-phase PWM signal $V_{P0}$, and the W-phase PWM signal $W_{P0}$ outputted from the three-phase PWM-signal generating circuit 1 are introduced into the interior of the circuit through the U-phase input terminal 101, the V-phase input terminal 102, and the W-phase input terminal 103, respectively. Here, the carrier signal waveform from the three-phase PWM-signal generating circuit 1 is triangular. As represented in the former part of FIG. 5, a case is considered in which values of the U-phase PWM signal $U_{P0}$ and the V-phase PWM signal $V_{P0}$ simultaneously rise at time $t_1$ from "low (L)" to "high (H)", that is, the U-phase switching device and the V-phase switching device simultaneously switch on. A portion of the U-phase PWM signal $U_{P0}$ introduced into the interior of the circuit is transmitted into the U-phase one-shot-pulse generating circuit 109. The U-phase one-shot-pulse generating circuit 109, in synch with the rising time of the signal $U_{P0}$, generates a blocking pulse $U_{P1}$ having a predetermined time width T1 as represented in FIG. 5; then, the blocking pulse $U_{P1}$ is transmitted into the V-phase NOR circuit 114 and the W-phase NOR circuit 118. In this embodiment, T1 is set at 0.5 µs. Similarly, a portion of the V-phase PWM signal $V_{P0}$ introduced into the interior of the circuit is transmitted into the V-phase one-shot-pulse generating circuit 113. The V-phase one-shot-pulse generating circuit 113, in synch with the rising time of the signal $V_{P0}$, generates a blocking pulse $V_{P1}$ having a predetermined time width T2 as represented in FIG. 5; then, the blocking pulse $V_{P1}$ is transmitted into the U-phase NOR circuit 110 and the W-phase NOR circuit 118. In this embodiment, T2 is set at 1.0 µs. A portion of the W-phase PWM signal $W_{P0}$ introduced into the interior of the circuit is transmitted into the W-phase one-shot-pulse generating circuit 117; however, because the value has not yet risen from "L" to "H", the W-phase one-shot-pulse generating circuit 117 never generates a blocking pulse $W_{P1}$.

As a blocking signal, the U-phase NOR circuit 110 outputs a low signal in a case in which either the blocking pulse $V_{P1}$ from the V phase or the blocking pulse $W_{P1}$ from the W phase is "H", meanwhile outputs a high signal in the other cases; because in this case only the V-phase blocking pulse $V_{P1}$ is transmitted, the V-phase blocking pulse $V_{P1}$, after having been inverted, is transmitted to the terminal S of the U-phase latch circuit 108. On the other hand, regarding the U-phase PWM signal $U_{P0}$ having been introduced inside this circuit, the other portion of the signal is transmitted, through the U-phase NOT circuit 107, to the terminal R of the U-phase latch circuit 108 in a state of having been inverted. The U-phase latch circuit 108, which has received the U-phase PWM signal $U_{P0}$ having been inverted through the U-phase NOT circuit 107, and the V-phase blocking pulse $V_{P1}$ having been inverted through the U-phase NOR circuit 110, outputs, following the truth table in FIG. 4, to the U-phase high-side output terminal 104 a signal in which the rising of the U-phase PWM signal $U_{P0}$ is delayed by the amount of the time width of T2, that is, the output signal $U_{P2}$ in which the rising of the U-phase PWM signal $U_{P0}$ as represented in FIG. 5 is blocked for the period of the V-phase blocking pulse $V_{P1}$ being "H". Similarly, the V-phase NOR circuit 114 outputs to the terminal S of the V-phase latch circuit 112 the U-phase blocking pulse $U_{P1}$ having been inverted, meanwhile regarding the V-phase PWM signal $V_{P0}$ having been introduced inside this circuit, the other portion of the signal is transmitted through the V-phase NOT circuit 111, to the terminal R of the V-phase latch circuit 112 in a state of having been inverted. The V-phase latch circuit 112 outputs, following the truth table in FIG. 4, to the V-phase high-side output terminal 105 a signal in which the rising of the V-phase PWM signal $V_{P0}$ is delayed by the amount of the time width of T1, that is, the output signal $V_{P2}$ in which the rising of the V-phase PWM signal $V_{P0}$ as represented in FIG. 5 is blocked for the period of the U-phase blocking pulse $U_{P1}$ being "H". Here, if T1 equals T2, because the rising of both the PWM signals having been delayed agrees again with each other, resulting in simultaneous switching; therefore, T1 should not equal T2 as in this embodiment.

Next, as represented in the latter part of FIG. 5, a case is considered in which, at first, a value of the W-phase PWM signal $W_{P0}$ rises from "L" to "H" at time $t_2$, then a value of the U-phase PWM signal $U_{P0}$ rises from "L" to "H" after an extremely short time of shorter than 0.5 µs. A portion of the W-phase PWM signal $W_{P0}$ introduced inside the circuit is outputted into the W-phase one-shot-pulse generating circuit 117. The W-phase one-shot-pulse generating circuit 117, in synch with the rising time of the signal $W_{P0}$, generates a blocking pulse $W_{P1}$ having a predetermined time width T3 as represented in FIG. 5; then, the blocking pulse $W_{P1}$ is transmitted into the U-phase NOR circuit 110 and the V-phase NOR circuit 114. In this embodiment, T3 is set at 1.5 µs. On the other hand, regarding the W-phase PWM signal $W_{P0}$ having been introduced inside this circuit, the other portion of the signal is transmitted, through the W-phase NOT circuit 115, to the terminal R of the W-phase latch circuit 116 in a state of having been inverted. Because the W-phase NOR circuit 118 has not received the U-phase blocking pulse $U_{P1}$ or the V-phase blocking pulse $V_{P1}$ at this moment, the circuit outputs a high signal to the terminal S of the W-phase latch circuit 116. Thereby, the W-phase latch circuit 116 outputs, following the truth table in FIG. 4, to the W-phase high-side output terminal 106 the W-phase PWM signal $W_{P0}$ intact, as the output signal $W_{P2}$, without blocking.

Regarding the U-phase PWM signal $U_{P0}$ having been introduced inside the circuit after an extremely short time, a portion of the signal is transmitted into the U-phase one-shot-pulse generating circuit 109. The U-phase one-shot-pulse generating circuit 109, in synch with the rising time of the signal $U_{P0}$, generates the blocking pulse $U_{P1}$ having the predetermined time width T1 as represented in FIG. 5; then, the blocking pulse $U_{P1}$ is transmitted into the V-phase NOR circuit 114 and the W-phase NOR circuit 118. At this time, the W-phase NOR circuit 118 having received the blocking pulse $U_{P1}$ outputs the low signal to the terminal S of the W-phase latch circuit 116; however, because the terminal R is in the "L" state, due to the terminal Q of the W-phase latch circuit 116 holds the last state according to the truth table in FIG. 4, the output signal $W_{P2}$ is never inverted to the "L" state. On the other hand, regarding the U-phase PWM signal $U_{P0}$ having been introduced inside the circuit, the other portion of the signal is transmitted through the U-phase NOT circuit 107 to the terminal R of the U-phase latch circuit 108 in a state of having been inverted. After receiving the inverted U-phase PWM signal $U_{P0}$ from the U-phase NOT circuit 107 and the inverted W-phase blocking pulse $W_{P1}$ from the U-phase NOR circuit 110, the U-phase latch circuit 108 outputs, according to the truth table in FIG. 4, a signal in which the rising of the U-phase PWM signal $U_{P0}$ is delayed by the amount of the time width T3 comparing to that of the W-phase PWM signal $W_{P0}$, that is, the output signal $U_{P2}$ in which the rising of the U-phase PWM signal $U_{P0}$ as represented in FIG. 5 is blocked for a period during which the W-phase blocking pulse $W_{p1}$ is "H" is outputted to the U-phase high-side output terminal 104.

In the above description, the operations of this embodiment have been explained about the two cases based on FIG. 5, in both cases of which, because a time difference between the two-phase switching timing has been set by delaying the time to switch on, the two-phase simultaneous switching operation is prevented, and the two phases are found to be switched on separately with a time interval of at least 0.5 µs. Moreover, in the above operational explanation, a case of U-phase and V-phase simultaneous switching was explained in the former part, while a case of simultaneous-switching with an extremely short time-difference between the U phase and the W phase has been explained in the latter part; because the configuration of the signal processing portion for each phase is the same, it is needless to say that similar operations are also realized in cases of other simultaneous switching or other simultaneous switching with an extremely short time difference. More conceptually explaining the operation of this embodiment, when an input signal to a phase rises from "L" to "H", in synch with the rising, the blocking-pulse generating means outputs into the other phases a blocking pulse having a predetermined time width. This blocking pulse serves as a signal that requests the other phases of preventing them from switching on during the value of the pulse being "H". The other phases implement ORs after receiving a plurality of blocking pulses from the blocking-signal creating means, and then create a blocking signal whose value becomes "H", during any one of the plurality of blocking pulses is "H" (hereinafter, referred to as a blocking period). Here, if necessary, an inverted blocking signal as in this embodiment may be outputted into the next signal blocking means. In this case, the blocking period becomes a period during which the value of the blocking signal is "L". Moreover, the other phases output to the output terminals output signals in which the rising of the other-phase input signals is blocked, by the signal blocking means, based on the blocking signal from the blocking-signal creating means, for only the blocking period The above explanation is a summary of the operation for preventing the simultaneous switching in this embodiment.

Figure 6:
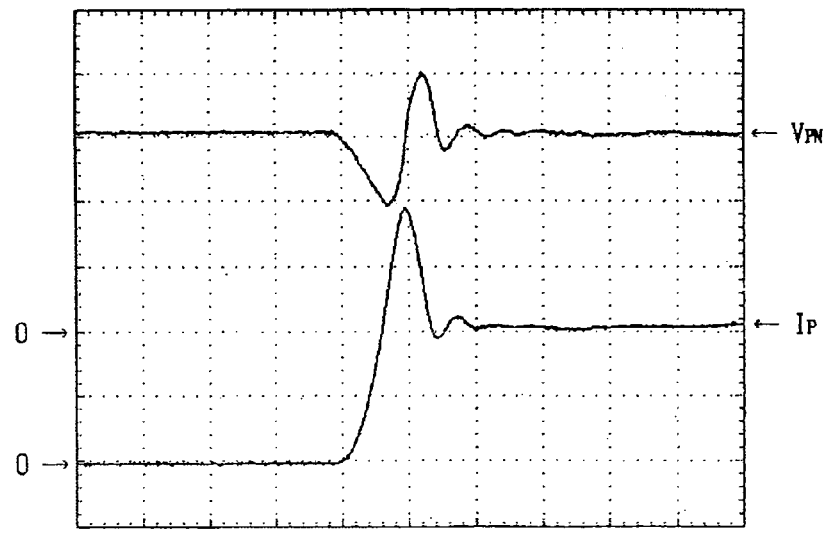
FIG. 6 is an oscilloscope-screen image of wave forms, according to a conventional three-phase PWM inverter, representing voltage $V_{PN}$ applied between a terminal P and a terminal N of the inverter, and current $I_P$ flowing into the inverter from the terminal P, at the moment of two-phase simultaneous switching.
Figure 7:
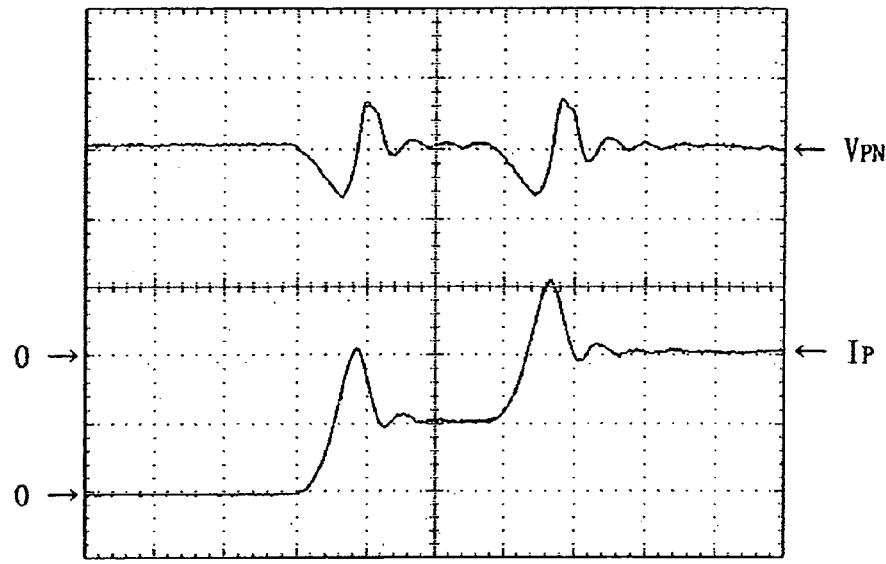
FIG. 7 is an oscilloscope-screen image of wave forms, according to a three-phase PWM inverter of the present invention, representing voltage $V_{PN}$ applied between a terminal P and a terminal N of the inverter, and current $I_P$ flowing into the inverter from the terminal P, at the moment of two-phase simultaneous switching.

Because this embodiment is configured and operates as described above, the two-phase simultaneous switching operation can be prevented; thereby, surge voltage, applied across the terminals of the switching device,-that is resultantly generated due to switching-device switching, can be reduced; as a result, switching loss can be reduced. FIG. 6 is an image on an oscilloscope screen representing waveforms of voltage $V_{PN}$ applied between the terminals P and N, and current $I_P$ flowing through the terminal P of the conventional three-phase PWM inverter (referred to FIG. 20) at the moment when the two-phase simultaneous switching is performed. FIG. 7 is an image of the oscilloscope screen representing waveforms of the voltage $V_{PN}$ applied between the terminals P and N, and the current $I_P$ flowing through the terminal P into the inverter of the three-phase PWM inverter according to this embodiment (referred to FIG. 1) at the moment when the two-phase simultaneous switching is performed. In both the figures, the horizontal axis indicates time, where the scale is 200 ns/div., and the vertical axis of the upper diagram indicates voltage, where the scale is 100 V/div., while the lower one indicates current, where the scale is 100 A/div. Comparing FIG. 6 and FIG. 7, in a case of the conventional three-phase PWM inverter having no two-phase simultaneous-switching prevention function (in FIG. 6), the maximum surge voltage of 402 V is applied against the normal voltage of 300 V, and in a case of the three-phase PWM inverter, having the two-phase simultaneous-switching prevention function, according to this embodiment (in FIG. 7), the maximum surge voltage of 370 V is applied against the normal voltage of 300 V; thus, an effect in reducing the surge voltage is represented.

Moreover, according to FIG. 6 and FIG. 7, when the time difference in which the two-phase switching devices switch on is not shorter than 0.5 µs, the surge voltage due to the two-phase switching doesn't overlap each other; therefore, this effect is found to be significant. Therefore, it is preferable that the above time widths T1, T2, and T3 are not shorter than 0.5 µs, and also each time width is set so as to have a time difference of not shorter than 0.5 µs with respect to the others.

Figure 8:
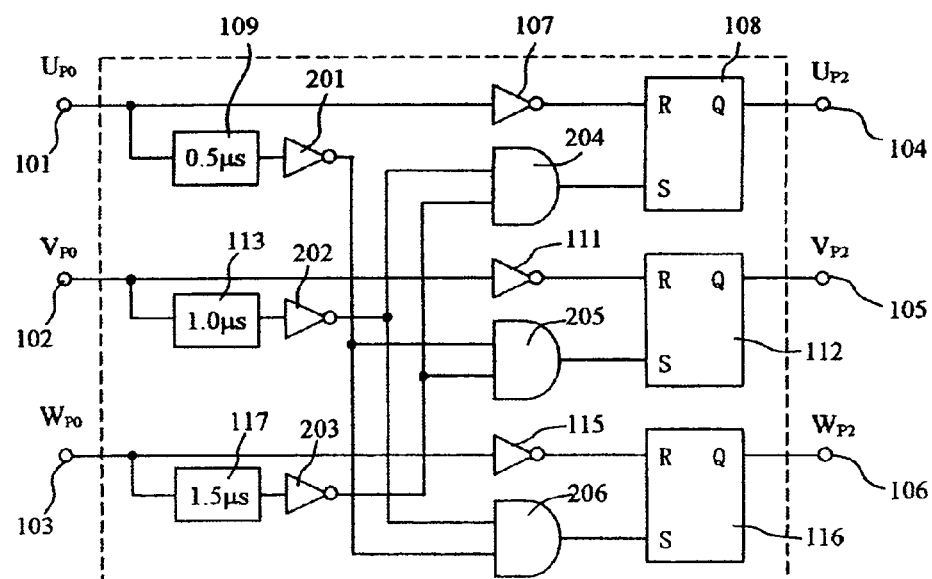
FIG. 8 is a circuit diagram illustrating a simultaneous-switching prevention circuit of Example 2 in Embodiment 1 according to the present invention.

The above idea for preventing the simultaneous switching according to Embodiment 1 can be also realized in a second example of a simultaneous-switching prevention circuit represented in FIG. 8 according to Embodiment 1 of the present invention. Because the same numerals in FIG. 8 denote the same elements in FIG. 2, their explanations are omitted The points differing from those in FIG. 2 are as follows: the U-phase NOR circuit, the V-phase NOR circuit, and the W-phase NOR circuit are replaced with a U-phase AND circuit 204, a V-phase AND circuit 205, and a W-phase AND circuit 206, respectively,; and a second U-phase NOT circuit 201 is inserted in the line on the way to the V-phase AND circuit 205 or the W-phase AND circuit 206 from the U-phase one-shot pulse generating circuit 109, a second V-phase NOT circuit 202 is inserted in the line on the way to the U-phase AND circuit 204 or the W-phase AND circuit 206 from the V-phase one-shot pulse generating circuit 113, and a second W-phase NOT circuit 203 is inserted in the line on the way to the U-phase AND circuit 204 or the V-phase AND circuit 205 from the W-phase one-shot pulse generating circuit 117. That is, the blocking-pulse generating means for each phase in the circuit illustrated in FIG. 2 is configured using an inverted OR circuit, on the other hand the blocking-pulse generating means for each phase in the circuit illustrated in FIG. 8 is configured using an AND circuit and inverter circuits that are connected to a plurality of the input terminals. Because both the configurations are obviously equivalent each other according to De Morgan's theorem, it is needles to say that the simultaneous-switching prevention circuit in FIG. 8 has the same function and effect as those in FIG. 2. However, because a second NOT circuit for each phase is needles in Example 1 represented in FIG. 2, Example 1 has an advantage in that the circuit configuration can be simplified.

Latch circuits used in the circuit illustrated in FIG. 2 or FIG. 8 operate based on the truth table in FIG. 4; however, if a subtle time difference occurs between signals inputted into the R-terminal and the S-terminal, the latch circuits may not operate according to the truth table in FIG. 4. For example, in a state in which both the values of the S-terminal and the R-terminal are "H", and accordingly, the value of the Q-terminal is "L", when both the values of the S-terminal and the R-terminal simultaneously transit to "L" at the next moment, the value of the Q-terminal remains "L" according to the truth table in FIG. 4; however, though this transition should fundamentally occur simultaneously, in a case in which a time lag occurs, so that the value of the R-terminal transits earlier than that of the S-terminal, a period during which the value of the S-terminal is "H" and that of the R-terminal is "L", and the value of the Q-terminal is "H" accordingly, can temporarily exist, depending on the length of the lag; because the value of the S-terminal transits to "L" in the period, the value of the Q-terminal remains "H", the same as that before the transition has occurred; thus, such an operation as has not been originally intended is induced. Because such an abnormal operation occurs when the values of the S-terminal and the R-terminal simultaneously transit from "H" to "L", if a state in which the values of the S-terminal and the R-terminal simultaneously transit from "H" to "L" can be avoided, the above described abnormal operation can be prevented.

Figure 9:
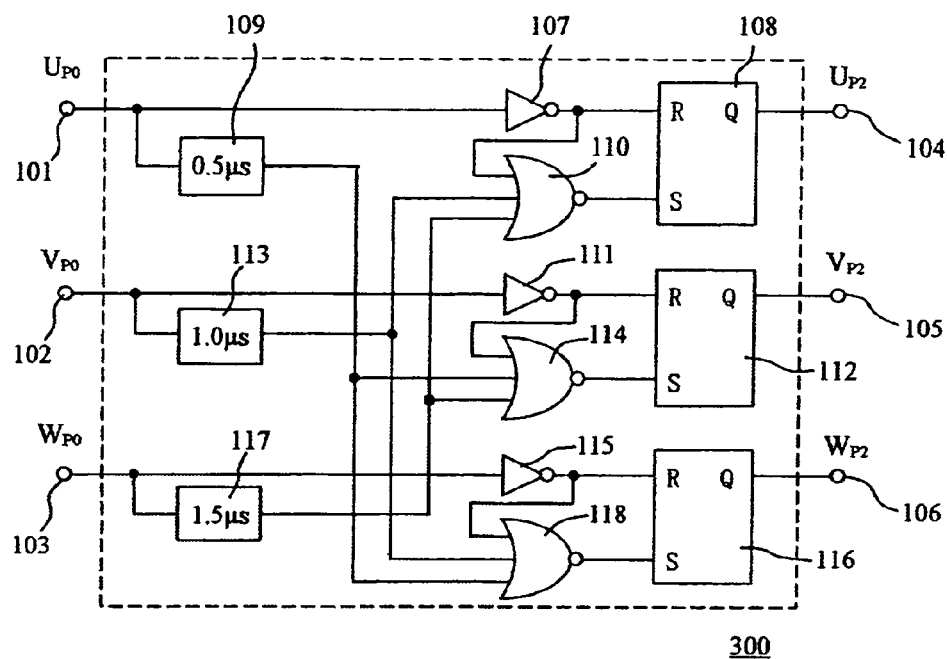
FIG. 9 is a circuit diagram illustrating a simultaneous-switching prevention circuit of Example 3 in Embodiment 1 according to the present invention.

In a third example illustrated in FIG. 9, a measure has been taken to prevent the above abnormal operation that may occur in the example illustrated in FIG. 2. That is, in the example illustrated in FIG. 2, the output signal from the U-phase NOT circuit 107 has been also supplied to the U-phase NOR circuit 110 by adding a new connecting line to the U-phase NOR circuit 110, so as to output a low signal when one of three signals that are the blocking pulse $V_{P1}$ from the V phase, the blocking pulse $W_{P1}$ from the W phase, and the output signal from the U-phase NOT circuit 107 is "H", and to output a high signal in the other cases. Similarly, the output signal from the V-phase NOT circuit 111 has been also supplied to the V-phase NOR circuit 114 by adding a new connecting line to the V-phase NOR circuit 114, so as to output the low signal when one of three signals that are the blocking pulse $U_{P1}$ from the U phase, the blocking pulse $W_{P1}$ from the W phase, and the output signal from the V-phase NOT circuit 111 is "H", and to output the high signal in the other cases. Moreover, the output signal from the W-phase NOT circuit 115 has been also supplied to the W-phase NOR circuit 118 by adding a connecting new line to the W-phase NOR circuit 118, so as to output the low signal when one of three signals that are the blocking pulse $U_{P1}$ from the U phase, the blocking pulse $V_{P1}$ from the V phase, and the output signal from the W-phase NOT circuit 115 is "H", and to output the high signal in the other cases. In the example illustrated in FIG. 9, by additionally providing such connecting lines, when the R-terminal value of each latch circuit is "H", one of the input terminals of each NOR circuit simultaneously comes into H-state, then each NOR circuit outputs the L-value to the S-terminal of each related latch circuit regardless of the values at the other input terminals; therefore, in the example illustrated in FIG. 9, it is understood that the state in which both the values of the S-terminal and the R-terminal simultaneously become "H" has been prevented. Moreover, when the value of the R-terminal is "H", regardless of whether the value of the S-terminal is "H" or "L", the value of the Q-terminal that is the output terminal is "L"; therefore, the simultaneous-switching prevention function is never affected by additionally providing these connecting lines.

Figure 10:
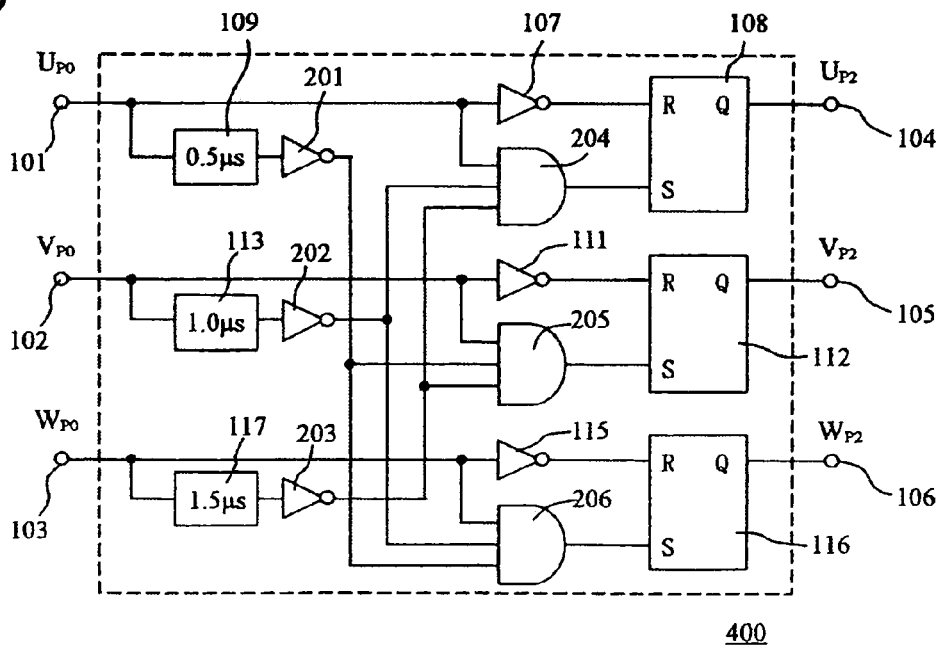
FIG. 10 is a circuit diagram illustrating a simultaneous-switching prevention circuit of Example 4 in Embodiment 1 according to the present invention.

The measure to prevent the abnormal operation of the above latch circuit can also be applied to the second example in FIG. 8, which is represented in Example 4 in FIG. 10. In the example illustrated in FIG. 10, a new connecting line has been added to supply a portion of the U-phase PWM signal $U_{P0}$ introduced from the U-phase high-side input terminal 101 to the U-phase AND circuit 204, as represented in the example illustrated in FIG. 8, so as to output the low signal when one of three signals that are the blocking pulse $V_{P1}$ from the V phase, the inverted blocking pulse $W_{P1}$ from the W phase, and the U-phase PWM signal $U_{P0}$ is "L", and to output the high signal in the other cases. Similarly, a new connecting line has also been added to supply a portion of the PWM signal $V_{P0}$ introduced from the V-phase high-side input terminal 102 to the V-phase AND circuit 205, so as to output the low signal when one of three signals that are the blocking pulse $U_{P1}$ from the U phase, the blocking pulse $W_{P1}$ from the W phase, and the PWM signal $V_{P0}$ is "L", and to output the high signal in the other cases. Moreover, a new connecting line has also been added to supply a portion of the PWM signal $W_{P0}$ introduced from the W-phase high-side input terminal 103 to the W-phase AND circuit 206, so as to output the low signal when one of three signals that are the blocking pulse $U_{P1}$ from the U phase, the blocking pulse $V_{P1}$ from the V phase, and the PWM signal $W_{P0}$ is "L", and to output the high signal in the other cases. In the example illustrated in FIG. 10, by additionally providing such connecting lines, because each value of the PWM signals is "L" when the R-terminal value of each latch circuit is "H", one of the input terminals of each AND circuit simultaneously comes into L-state, then each AND circuit outputs the L-value to the S-terminal of each latch circuit regardless of the values at the other input terminal; therefore, in the example illustrated in FIG. 10, it is understood that a state in which both the values of the S-terminal and the R-terminal simultaneously become "H" has been prevented. Moreover, when the value of the R-terminal is "H", regardless of whether the value of the S-terminal is "H" or "L", the value of the Q-terminal being the output terminal is "L"; therefore, the simultaneous-switching prevention function is not affected by these additional connecting lines.

When a carrier signal waveform in the three-phase PWM-signal generating circuit is triangular, it may be enough to only consider two-phase simultaneous-switching prevention; however, when the carrier signal waveform is saw-tooth, three-phase simultaneous-switching prevention also needs to be considered. In the simultaneous-switching prevention circuit 100 illustrated in FIG. 2, when the PWM signals $U_{P0}$, $V_{P0}$, and $W_{P0}$ that induce the three-phase simultaneous switching are inputted, the U-phase output signal $U_{P2}$ becomes a signal in which the rising of the PWM signal $U_{P0}$ is blocked for a time width T2 or T3 whichever longer, the V-phase output signal $V_{P2}$ becomes a signal in which the rising of the PWM signal $V_{P0}$ is blocked for a time width T1 or T3 whichever longer, and the W-phase output signal $W_{P2}$ becomes a signal in which the rising of the PWM signal $W_{P0}$ is blocked for a time width T1 or T2 whichever longer. When T1, T2<T3, the U-phase output signal $U_{P2}$ and the V-phase signal $V_{P2}$ simultaneously rise even after processed by the simultaneous-switching prevention circuit in FIG. 2; thus, the simultaneous switching in the switching device can not be perfectly prevented. Inheriting the concept of the simultaneous-switching prevention circuit in Embodiment 1, a simultaneous-switching prevention circuit that can effectively operate also in the above three-phase simultaneous switching is represented in Example 5 illustrated in FIG. 11.

Figure 11:
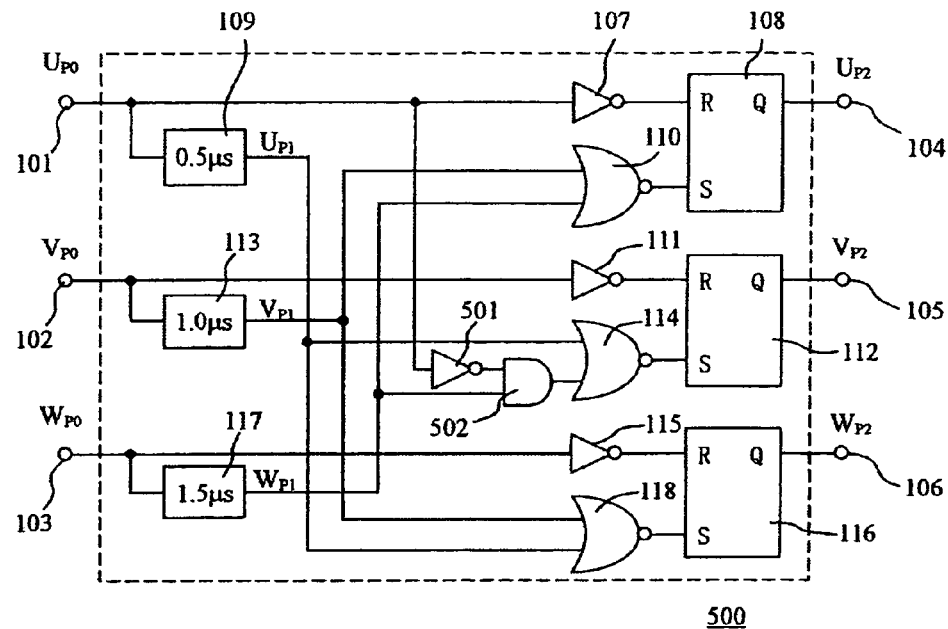
FIG. 11 is a circuit diagram illustrating a simultaneous-switching prevention circuit of Example 5 in Embodiment 1 according to the present invention.

Hereinafter, a simultaneous-switching prevention circuit 500 used in Example 5 according to Embodiment 1 of the present invention is explained referring to FIG. 11. Because the same numerals in FIG. 11 as those in FIG. 2 represent the same elements, their explanations are omitted. The difference from FIG. 2 is that a blocking-pulse prevention circuit composed of a NOT circuit 501 and an AND circuit 502 are inserted in the signal line from the W-phase one-shot pulse generating circuit 117 to the input side of the V-phase NOR circuit 114. That is, the AND circuit 502 is connected in such a way that the PWM signal $U_{P0}$, which has been branched from the U-phase signal line, and then inverted through the NOT circuit 501, is supplied to one of its inputs, while output from the W-phase one-shot pulse generating circuit 117 is supplied to the other input, so as to output to one of the terminal of the V-phase NOR circuit 114 the AND of both the inputs.

Figure 12:
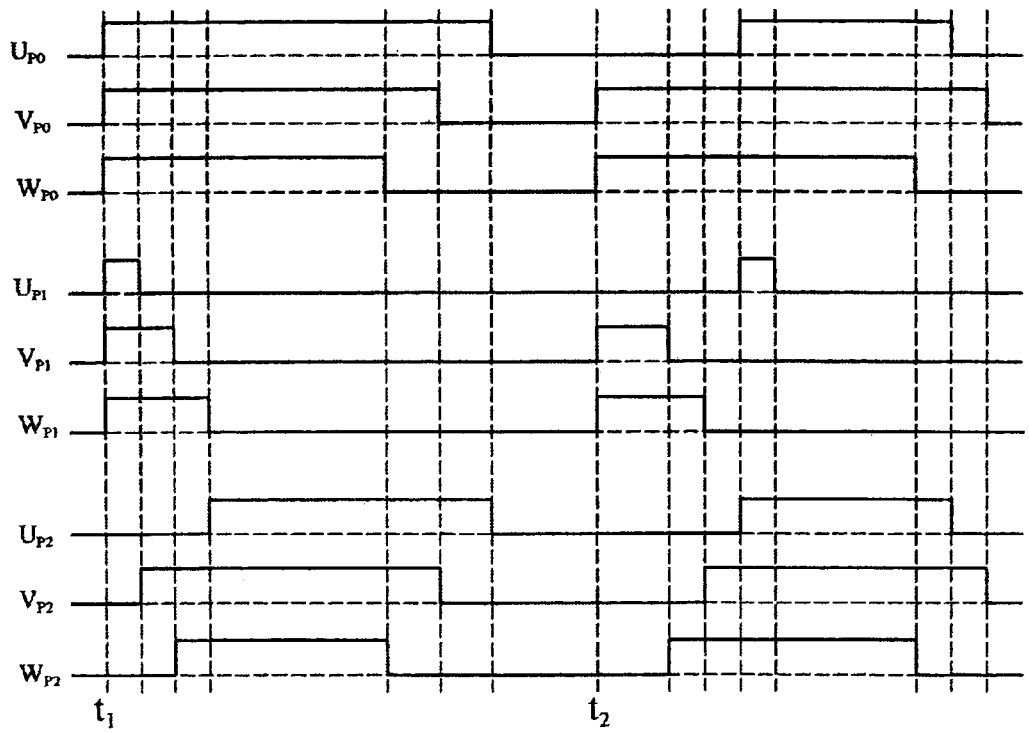
FIG. 12 is a timing chart representing an operation of the simultaneous-switching prevention circuit of Example 5 in Embodiment 1 according to the present invention.

The three-phase simultaneous switching is prevented by a simultaneous-switching prevention circuit configured as above, and its operation is explained using FIG. 12. FIG. 12 is a timing chart illustrating the operation of the simultaneous-switching prevention circuit of Example 5 according to Embodiment 1 of the present invention. The U-phase PWM signal $U_{P0}$, V-phase PWM signal $V_{P0}$, and the W-phase PWM signal $W_{P0}$ outputted from the three-phase PWM-signal generating circuit are introduced into this circuit through the U-phase input terminal 101, the V-phase input terminal 102, and the W-phase input terminal 103, respectively. Here, because the carrier signal waveform from the three-phase PWM signal generating circuit 1 is saw-tooth, as represented in the former part of FIG. 12, a case is described in which the values of the U-phase PWM signal $U_{P0}$, the V-phase PWM signal $V_{P0}$, and the W-phase PWM signal $W_{P0}$ at time ti simultaneously rise, that is, the U-phase, V-phase, and W-phase switching devices simultaneously switch on. A portion of the U-phase PWM signal $U_{P0}$ introduced into this circuit is transmitted to the U-phase one-shot pulse generating circuit 109. The U-phase one-shot pulse generating circuit 109 generates, in synch with this rising, the blocking pulse $U_{P1}$ having the predetermined time width T1 as represented in FIG. 12; then, this blocking pulse $U_{P1}$ is transmitted to the V-phase NOR circuit 114 and the W-phase NOR circuit 118. T1 is set at 0.5 is in this example. Similarly, a portion of the V-phase PWM signal $V_{P0}$ introduced into this circuit is transmitted to the V-phase one-shot pulse generating circuit 113. The V-phase one-shot pulse generating circuit 113 generates, in synch with this rising, the blocking pulse $V_{P1}$ having the predetermined time width T2 as represented in FIG. 12; then, this blocking-pulse $V_{P1}$ is transmitted to the U-phase NOR circuit 110 and the W-phase NOR circuit 118. T2 is set at 1.0 μs in this example. A portion of the W-phase PWM signal $W_{P0}$ introduced into this circuit is transmitted to the W-phase one-shot pulse generating circuit 117. The W-phase one-shot pulse generating circuit 117 generates, in synch with this rising, the blocking pulse $W_{P1}$ having the predetermined time width T3 as represented in FIG. 12; then, this blocking pulse $W_{P1}$ is transmitted to the U-phase NOR circuit 110 and the AND circuit 502. T3 is set at 1.5 μs in this example.

The U-phase NOR circuit 110 outputs the low signal as a blocking signal in a case in which either the blocking pulse $V_{P1}$ from the V phase or the blocking pulse $W_{P1}$ from the W phase is "H", meanwhile outputs the high signal in the other cases; because in this case both the V-phase blocking pulse $V_{P1}$ and the W-phase blocking pulse $W_{P1}$ have been transmitted, and T2<T3, the inverted W-phase blocking pulse $W_{P1}$ is transmitted to the terminal S of the U-phase latch circuit 108. On the other hand, regarding the U-phase PWM signal $U_{P0}$ having been introduced inside this circuit, the other portion of the signal is transmitted, through the U-phase NOT circuit 107, to the terminal R of the U-phase latch circuit 108 in a state of having been inverted. The U-phase latch circuit 108, which has received the U-phase PWM signal $U_{P0}$ having been inverted through the U-phase NOT circuit 107, and the W-phase blocking pulse $W_{P1}$ having been inverted through the U-phase NOR circuit 110, outputs, following the truth table in FIG. 4, to the U-phase high-side output terminal 104 a signal in which the rising of the U-phase PWM signal $U_{P0}$ is delayed by the amount of the time width of T3, that is, the output signal $U_{P2}$ in which the rising of the U-phase PWM signal $U_{P0}$ as represented in FIG. 12 is blocked for the period of the V-phase blocking pulse $W_{P1}$ being "H". Similarly, the W-phase NOR circuit 118 outputs to the terminal S of the W-phase latch circuit 116 the V-phase blocking pulse $V_{P1}$ having been inverted because T1<T2, meanwhile regarding the W-phase PWM signal $W_{P0}$ having been introduced inside this circuit, the other portion of the signal is transmitted through the W-phase NOT circuit 115, to the terminal R of the W-phase latch circuit 116 in a state of having been inverted. The W-phase latch circuit 116 outputs, following the truth table in FIG. 4, to the W-phase high-side output terminal 106 a signal in which the rising of the W-phase PWM signal $W_{P0}$ is delayed by the amount of the time width of T2, that is, the output signal $W_{P2}$ in which the rising of the W-phase PWM signal $W_{P0}$ as represented in FIG. 12 is blocked for the period of the V-phase blocking pulse $V_{P1}$ being "H".

The V-phase NOR circuit 114 outputs the low signal in a case in which either the U-phase blocking pulse $U_{P1}$ or the W-phase blocking pulse $W_{P1}$ is "H", meanwhile outputs a high signal in the other cases; however, because in this example the blocking-pulse prevention circuit is inserted in the signal line from the W-phase one-shot pulse generating circuit 117 to the input of the V-phase NOR circuit 114, its operation becomes different from those of the other phases. Because in this blocking-pulse prevention circuit, the AND of the W-phase blocking pulse $W_{P1}$ and the inverted U-phase PWM signal $U_{P0}$ is used, when the U-phase PWM signal $U_{P0}$ is "H", the W-phase blocking pulse $W_{P1}$ is controlled, consequently, it is not outputted into the V-phase NOR circuit 114. Therefore, when the values of the U-phase PWM signal $U_{P0}$, the V-phase PWM signal $V_{P0}$, and the W-phase PWM signal $W_{P0}$, as represented in the former part of FIG. 12, simultaneously rise from "L" to "H", because this blocking-pulse prevention circuit operates so that the W-phase blocking pulse $W_{P1}$ is not transmitted into the V-phase NOR circuit 114, the output of the V-phase NOR circuit 114 becomes an inverted U-phase blocking pulse $U_{P1}$; consequently, the V-phase latch circuit 112 outputs, following the truth table in FIG. 4, to the V-phase high-side output terminal 105 a signal in which the rising of the V-phase PWM signal $V_{P0}$ is delayed by the amount of the time width of T1, that is, the output signal $V_{P2}$ in which the rising of the V-phase PWM signal $V_{P0}$ as represented in FIG. 12 is blocked for the period of the U-phase blocking pulse $U_{P1}$ being "H".

Next, as represented in the latter part of FIG. 12, a case is considered in which values of the V-phase PWM signal $V_{p0}$ and the W-phase PWM signal $W_{P0}$ simultaneously rise from "L" to "H" at time $t_2$, that is, the V-phase switching device and the W-phase switching device simultaneously switch on. Regarding the V-phase PWM signal $V_{P0}$ having been introduced inside this circuit, a portion of the signal is transmitted into the V-phase one-shot pulse generating circuit 113. The V-phase one-shot pulse generating circuit 113, in synch with the rising, generates a blocking pulse $V_{P1}$ having a predetermined time width T2 as represented in FIG. 12; then, this blocking pulse $V_{P1}$ is transmitted into the U-phase NOR circuit 110 and the W-phase NOR circuit 118. Regarding the W-phase PWM signal $W_{P0}$ having been introduced inside this circuit, a portion of the signal is transmitted into the W-phase one-shot pulse generating circuit 117. The W-phase one-shot pulse generating circuit 117, in synch with the rising, generates a blocking pulse $W_{P1}$ having a predetermined time width T3 as represented in FIG. 12; then, this blocking pulse $W_{P1}$ is transmitted into the U-phase NOR circuit 110 and the AND circuit 502. Here, the blocking pulse $W_{P1}$ having been transmitted into the AND circuit 502 is logically multiplied by the inverted U-phase PWM signal $U_{P0}$. Because the U-phase PWM signal $U_{P0}$ remains "L" at this point, the AND circuit 502 continues to output to the V-phase NOR circuit 114 the blocking pulse $W_{P1}$. Therefore, the V-phase latch circuit 112 outputs, following the truth table in FIG. 4, to the V-phase high-side output terminal 105 a signal in which the rising of the V-phase PWM signal $V_{P0}$ is delayed by the amount of the time width of T3, that is, the output signal $V_{P2}$ in which the rising of the V-phase PWM signal $V_{P0}$ as represented in FIG. 12 is blocked for the period of the V-phase blocking pulse $V_{P1}$ being "H". The W-phase NOR circuit 118 outputs, as a blocking signal, the low signal when either the U-phase blocking pulse $U_{P1}$ or the V-phase blocking pulse $V_{P1}$ is "H", meanwhile outputs the high signal in the other cases. Because only the V-phase blocking pulse $V_{P1}$ has been transmitted in this case, the circuit transmits to the terminal S of the W-phase latch circuit 116 the inverted V-phase blocking pulse $V_{P1}$. The W-phase latch circuit 116 outputs, following the truth table in FIG. 4, to the W-phase high-side output terminal 106 a signal in which the rising of the W-phase PWM signal $W_{P0}$ is delayed by the amount of the time width of T2, that is, the output signal $W_{P2}$ in which the rising of the W-phase PWM signal $W_{P0}$ as represented in FIG. 12 is blocked for the period of the V-phase blocking pulse $V_{P1}$ being "H".

As explained above, because the blocking-pulse prevention circuit has a function that prevents the blocking pulse $W_{P1}$ form being outputted when the U-phase PWM signal $U_{P0}$ becomes "H", and passes the blocking pulse $W_{P1}$ intact through the circuit when the U-phase PWM signal $U_{P0}$ becomes "L", in this example in which the blocking-pulse prevention circuit is additionally provided, it is understood that not only the two-phase simultaneous-switching but the three-phase simultaneous-switching can be prevented.

Moreover, this blocking-pulse prevention circuit is suitably provided on a phase in which a blocking pulse having a medium time width is generated, that is, the V phase as in this example. Because in the U-phase NOR circuit 110 T2 or T3 whichever longer, in the V-phase NOR circuit 114 T1 or T3 whichever longer, and in the W-phase NOR circuit 118 T1 or T2 whichever longer are made to be their blocking period, respectively, in a case where T1<T2<T3, if the blocking-pulse prevention circuit is provided on the U phase, the blocking periods become T2, T3, and T2 for the U phase, V phase, and W phase, respectively; consequently, the simultaneous switching cannot be appropriately prevented. Moreover, although not illustrated in the figure, it is easily understood that a blocking-pulse prevention circuit can also be similarly added to the circuit of Example 3 represented in FIG. 9.

Figure 13:
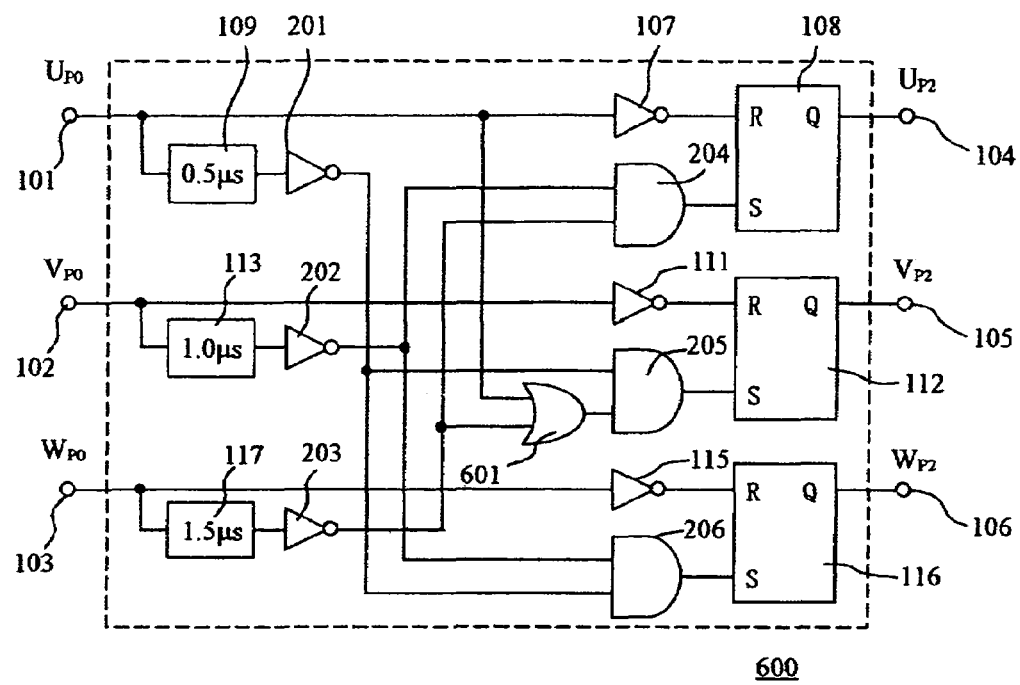
FIG. 13 is a circuit diagram illustrating a simultaneous-switching prevention circuit of Example 6 in Embodiment 1 according to the present invention.

Addition of such a blocking-pulse prevention circuit can be also applied to the example in FIG. 8. FIG. 13 illustrates a circuit-configuration view of a simultaneous-switching prevention circuit 600 used in Example 6 in which a blocking-pulse prevention circuit is additionally provided in Example 2 of Embodiment 1 according to the present invention. Because the same numerals in FIG. 13 as those in FIG. 8 represent the same elements, their explanations are omitted. The difference from FIG. 8 is that a blocking-pulse prevention circuit composed of a V-phase OR circuit 601 is inserted in the signal line from the W-phase one-shot pulse generating circuit 117 to the input side of the V-phase AND circuit 205. That is, the V-phase OR circuit 601 is connected in such a way that the PWM signal $U_{P0}$ on the U-phase signal line is inputted into one of its input terminals, meanwhile the inverted signal outputted from the W-phase one-shot pulse generating circuit 117 is inputted into the other input terminal, so as to output to one of the terminals of the V-phase AND circuit 205 the OR of both of the input. The configuration of the blocking-pulse prevention circuit in this example is different from that in the example represented in FIG. 11; however, because it can easily prove, according to De Morgan's theorem, that the entire configurations of both the examples are equivalent each other, it is needles to say that the simultaneous-switching prevention circuit in FIG. 13 has the same function and effect as those in FIG. 11. Moreover, although not illustrated in the figure, it can be easily understood that such a blocking-pulse prevention circuit can be similarly added also to the circuit in Example 4 represented in FIG. 10.

Embodiment 2

Figure 14:
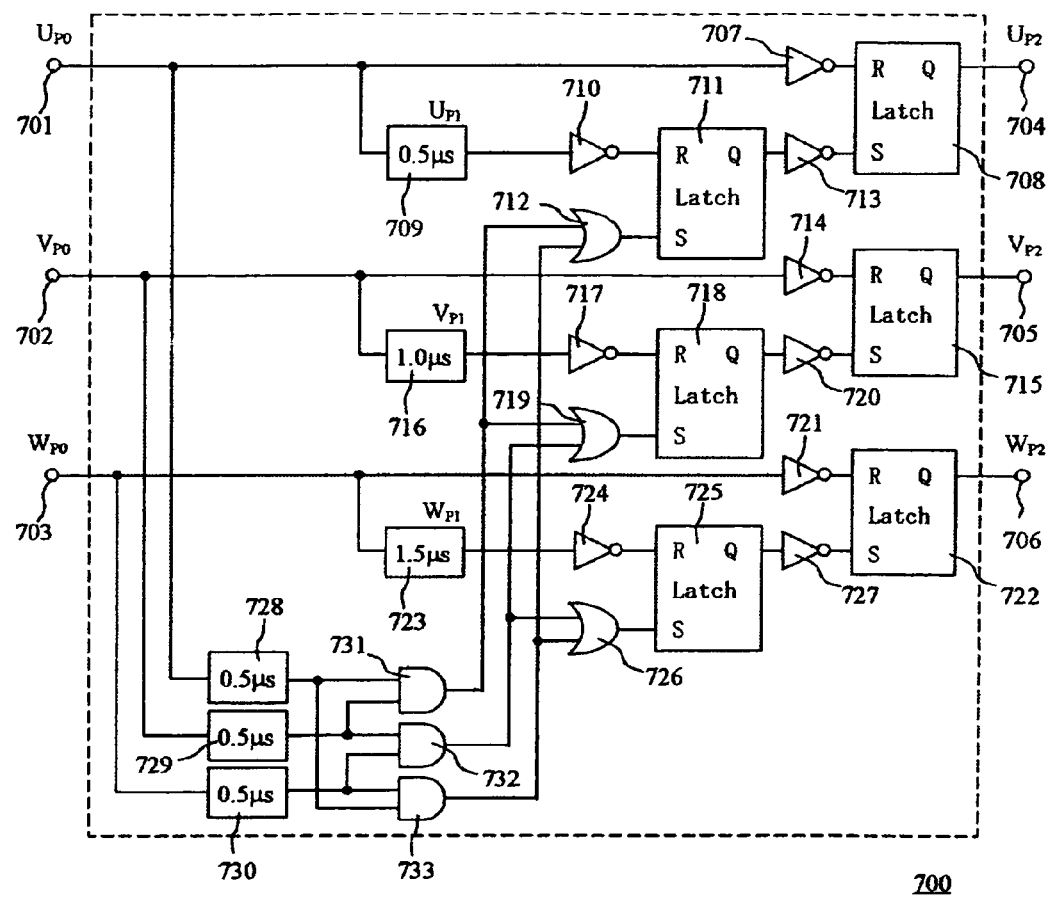
FIG. 14 is a circuit diagram illustrating a simultaneous-switching prevention circuit of Example 1 in Embodiment 2 according to the present invention.

Hereinafter, a PWM inverter of Example 1 in Embodiment 2 according to the present invention is explained referring to figures. The configuration of the entire system is the same as that in FIG. 1, and because the simultaneous-switching prevention circuit 100 has only been changed to a simultaneous-switching prevention circuit 700, the drawings and explanation are omitted. FIG. 14 is a circuit block diagram illustrating an internal configuration of this simultaneous-switching prevention circuit 700, in which input means, as an interface to an external circuit, composed of a U-phase high-side input terminal 701 for receiving the high-side PWM signal $U_{P0}$ from the three-phase PWM signal generating circuit 1, a V-phase high-side input terminal 702 for receiving the high-side PWM signal $V_{P0}$ from the three-phase PWM signal generating circuit 1, and a W-phase high-side input terminal 703 for receiving the high-side PWM signal $W_{P0}$ from the three-phase PWM signal generating circuit 1, and output means composed of a U-phase high-side output terminal 704 for outputting to the gate driving circuit 3a the output signal $U_{P2}$, a V-phase high-side output terminal 705 for outputting to the gate driving circuit 3b the output signal $V_{P2}$, and a W-phase high-side output terminal 706 for outputting to the gate driving circuit 3c the output signal $W_{P2}$ are provided.

In the circuit illustrated in FIG. 14, a portion taking part in the high-side U-phase signal processing is composed of a first U-phase NOT circuit 707 and a first U-phase latch circuit 708 as the U-phase signal blocking means, a U-phase one-shot pulse generating circuit 709 as the U-phase blocking-signal generating means, a second U-phase NOT circuit 710, a second U-phase latch circuit 711, a U-phase OR circuit 712, and a third U-phase NOT circuit 713. Similarly, a portion taking part in the high-side V-phase signal processing is composed of a first V-phase NOT circuit 714 and a first V-phase latch circuit 715 as the V-phase signal blocking means, a V-phase one-shot pulse generating circuit 716 as the V-phase blocking-signal generating means, a second V-phase NOT circuit 717, a second V-phase latch circuit 718, a V-phase OR circuit 719, and a third V-phase NOT circuit 720. Moreover, similarly, a portion taking part in the high-side W-phase signal processing is composed of a first W-phase NOT circuit 721 and a first W-phase latch circuit 722 as the W-phase signal blocking means, a W-phase one-shot pulse generating circuit 723 as the W-phase blocking-signal generating means, a second W-phase NOT circuit 724, a second W-phase latch circuit 725, a W-phase OR circuit 726, and a third W-phase NOT circuit 727. This circuit, except for the portions related to the above described respective phase signal processing, is further composed of a simultaneous-switching detection means, such as a first one-shot pulse generating circuit 728, a second one-shot pulse generating circuit 729, a third one-shot pulse generating circuit 730, a first AND circuit 731, a second AND circuit 732, and a third AND circuit 733.

The line from the U-phase high-side input terminal 701 branches into three lines on the way; then, one of the lines is connected to the input of the first one-shot pulse generating circuit 728, the other one is connected to the input of the U-phase one-shot pulse generating circuit 709, and the remaining one is connected to the input of the first U-phase NOT circuit 707. The line from the V-phase high-side input terminal 702 branches into three lines on the way; then, one of the lines is connected to the input of the second one-shot pulse generating circuit 729, the other one is connected to the input of the V-phase one-shot pulse generating circuit 716, and the remaining one is connected to the input of the first V-phase NOT circuit 714. The line from the W-phase high-side input terminal 703 branches into three lines on the way; then, one of the lines is connected to the input of the third one-shot pulse generating circuit 730, the other one is connected to the input of the W-phase one-shot pulse generating circuit 723, and the remaining one is connected to the input of the first W-phase NOT circuit 721. The line from the output of the first one-shot pulse generating circuit 728 branches on the way; then, one of the lines is connected to the input of the first AND circuit 731, while the other is connected to the input of the third AND circuit 733. The line from the output of the second one-shot pulse generating circuit 729 branches into two lines on the way; then, one of the lines is connected to the input of the first AND circuit 731, while the other is connected to the input of the second AND circuit 732. The line from the output of the third one-shot pulse generating circuit 730 branches into two lines on the way; then, one of the lines is connected to the input of the second AND circuit 732, while the other is connected to the input of the third AND circuit 733. The line from the output of the first AND circuit 731 branches into two lines on the way; then, one of the lines is connected to the input of the U-phase OR circuit 712, while the other is connected to the input of the V-phase OR circuit 719. The line from the output of the second AND circuit 732 branches into two lines on the way; then, one of the lines is connected to the input of the V-phase OR circuit 719, while the other is connected to the input of the W-phase OR circuit 726. The line from the output of the third AND circuit 733 branches into two lines on the way; then, one of the lines is connected to the input of the U-phase OR circuit 712, while the other is connected to the input of the W-phase OR circuit 726. The line from the output of the U-phase one-shot pulse generating circuit 709 is connected to the input of the second U-phase NOT circuit 710. The line from the output of the V-phase one-shot pulse generating circuit 716 is connected to the input of the second V-phase NOT circuit 717. The line from the output of the W-phase one-shot pulse generating circuit 723 is connected to the input of the second W-phase NOT circuit 724. The line from the output of the second U-phase NOT circuit 710 is connected to the R-terminal of the second U-phase latch circuit 711, the line from the output of the U-phase OR circuit 712 is connected to the S-terminal of the second U-phase latch circuit 711, and the line from the Q-terminal of the second U-phase latch circuit 711 is connected to the input of the third U-phase NOT circuit 713. The line from the output of the first U-phase NOT circuit 707 is connected to the R-terminal of the first U-phase latch circuit 708, the line from the output of the third U-phase NOT circuit 713 is connected to the S-terminal of the first U-phase latch circuit 708, and the line from the Q-terminal of the first U-phase latch circuit 708 is connected to the U-phase high-side output terminal 704. The line from the output of the second V-phase NOT circuit 717 is connected to the R-terminal of the second V-phase latch circuit 718, the line from the output of the V-phase OR circuit 719 is connected to the S-terminal of the second V-phase latch circuit 718, and the line from the Q-terminal of the second V-phase latch circuit 718 is connected to the input of the third V-phase NOT circuit 720. The line from the output of the first V-phase NOT circuit 714 is connected to the R-terminal of the first V-phase latch circuit 715, the line from the output of the third V-phase NOT circuit 720 is connected to the S-terminal of the first V-phase latch circuit 715, and the line from the Q-terminal of the first V-phase latch circuit 715 is connected to the V-phase high-side output terminal 705. The line from the output of the second W-phase NOT circuit 724 is connected to the R-terminal of the second W-phase latch circuit 725, the line from the output of the W-phase OR circuit 726 is connected to the S-terminal of the second W-phase latch circuit 725, and the line from the Q-terminal of the second W-phase latch circuit 725 is connected to the input of the third W-phase NOT circuit 727. The line from the output of the first W-phase NOT circuit 721 is connected to the R-terminal of the first W-phase latch circuit 722, the line from the output of the third W-phase NOT circuit 727 is connected to the S-terminal of the first W-phase latch circuit 722, and the line from the Q-terminal of the first W-phase latch circuit 722 is connected to the W-phase high-side output terminal 706. In FIG. 14, only a high-side simultaneous-switching prevention circuit is illustrated. Although a similar simultaneous-switching prevention circuit is provided on the low side, because the circuit configuration becomes the same as that configuration, the drawing is omitted. Here, each of the latch circuits is a circuit, for example, as illustrated in FIG. 3, that operates according to the truth table in FIG. 4.

Figure 15:
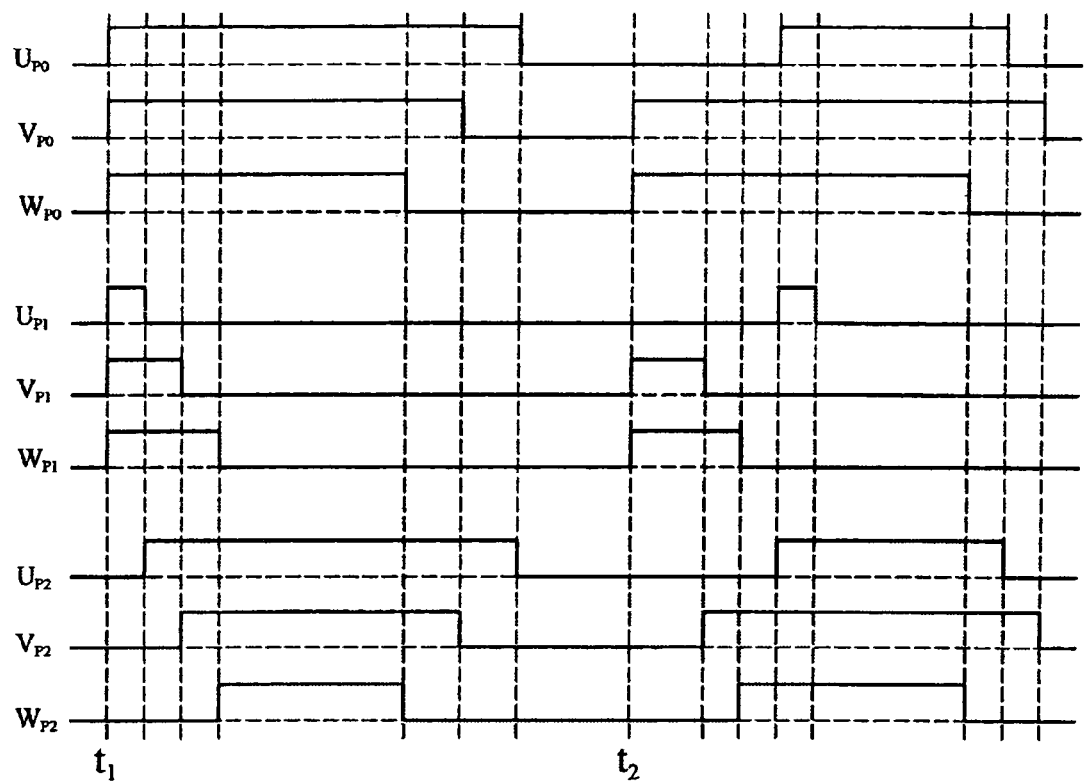
FIG. 15 is a timing chart representing an operation of the simultaneous-switching prevention circuit of Example 1 in Embodiment 2 according to the present invention.

Using such configured simultaneous-switching prevention circuit, not only the two-phase simultaneous switching but the three-phase simultaneous switching are prevented; then, the operation is explained using FIG. 15. FIG. 15 is a tiling chart representing the operation of the simultaneous-switching prevention circuit of Example 1 in Embodiment 2 according to the present invention. The U-phase PWM signal $U_{P0}$, the V-phase PWM signal $V_{P0}$, and the W-phase PWM signal $W_{P0}$ that have been outputted from the three-phase PWM signal generating circuit are introduced inside the circuit through the U-phase input terminal 701, the V-phase input terminal 702, and the W-phase input terminal 703, respectively. Here, as represented in the former part of FIG. 15, a case is considered in which values of the U-phase PWM signal $U_{P0}$, the V-phase PWM signal $V_{P0}$, and the W-phase PWM signal $W_{P0}$ simultaneously rise from "L" to "H" at time $t_1$, that is, the U-phase, V-phase, and W-phase switching devices simultaneously switch on. Regarding the U-phase PWM signal $U_{P0}$ having been introduced inside the circuit, a portion of the signal is transmitted into the first one-shot pulse generating circuit 728. The first one-shot pulse generating circuit 728, in synch with the rising, generates a U-phase switching detection pulse having a time width of 0.5 µs, and supplies the pulse into the first AND circuit 731 and the third AND circuit 733. Similarly, regarding the V-phase PWM signal $V_{P0}$ having been introduced inside the circuit, a portion of the signal is transmitted into the second one-shot pulse generating circuit 729; then, the second one-shot pulse generating circuit 729, in synch with the rising, generates a V-phase switching detection pulse having a time width of 0.5 µs, and supplies the pulse into the first AND circuit 731 and the second AND circuit 732. Moreover, similarly, regarding the W-phase PWM signal $W_{P0}$ having been introduced inside the circuit, a portion of the signal is transmitted into the third one-shot pulse generating circuit 730; then, the third one-shot pulse generating circuit 730, in synch with the rising, generates a W-phase switching detection pulse having a time width of 0.5 µs, and supplies the pulse into the second AND circuit 732 and the third AND circuit 733.

The first AND circuit 731 outputs the AND of the U-phase switching detection pulse and the V-phase switching detection pulse, that is, the value "H", when both the U-phase switching detection pulse and the V-phase switching detection pulse are "H". Because the lime widths of both the detection pulses are 0.5 µs, this means that the first AND circuit 731 outputs a simultaneous-switching detection signal, when both the U-phase and V-phase PWM signals rise within not longer than 0.5 µs of the time width. Similarly, the second AND circuit 732 outputs the AND of the V-phase switching detection pulse and the W-phase switching detection pulse, that is, the value "H", when both the V-phase switching detection pulse and the W-phase switching detection pulse are "H", and this means that the second AND circuit 732 outputs a simultaneous-switching detection signal, when both the V-phase and W-phase PWM signals rise within not longer than 0.5 µs of the time width. Moreover, similarly, the third AND circuit 733 outputs the AND of the U-phase switching detection pulse and the W-phase switching detection pulse, that is, the value "H", when both the U-phase switching detection pulse and the W-phase switching detection pulse are "H", and this means that the third AND circuit 733 outputs a simultaneous-switching detection signal, when both the U-phase and W-phase PWM signals rise within not longer than 0.5 µs of the time width.

Therefore, as represented in the former part of FIG. 15, when the values of the U-phase PWM signal $U_{P0}$, the V-phase PWM signal $V_{P0}$, and the W-phase PWM signal $W_{P0}$ rise from "L" to "H", all of the first AND circuit 731, the second AND circuit 732, and the third AND circuit 733 output the value "H".

On the other hand, regarding the U-phase PWM signal $U_{P0}$ having been introduced inside the circuit, a portion of the signal is transmitted into the U-phase one-shot pulse generating circuit 709. The U-phase one-shot pulse generating circuit 709, in synch with the rising, generates a U-phase blocking pulse $U_{P1}$ having the predetermined time width T1 as represented in FIG. 15; then, the U-phase blocking pulse $U_{P1}$ is transmitted through the second U-phase NOT circuit 710 to the terminal R of the second U-phase latch circuit 711 in the inverted state. T1 has been set at 0.5 µs in this example. The U-phase OR circuit 712 outputs to the terminal S of the second latch circuit 711 the AND of the simultaneous-switching detection signals from the first AND circuit 731 and from the third AND circuit 733. That is, in a case in which the U-phase PWM signal $U_{P0}$ simultaneously rises with either the V-phase PWM signal $V_{P0}$ or the W-phase PWM signal $W_{P0}$ rising, the U-phase OR circuit 712 outputs the value "H" for a period of 0.5 µs from the rising. Because the second U-phase latch circuit 711 receives these two signals and outputs a signal according to the truth table in FIG. 4, in this case, the circuit directly outputs the U-phase blocking pulse $U_{P1}$, and supplies through the third U-phase NOT circuit 713 to the terminal S of the first U-phase latch circuit 708 the pulse in the inverted state. Moreover, regarding the U-phase PWM signal $U_{P0}$ having been introduced inside the circuit, a portion of the remaining signal is supplied through the first U-phase NOT circuit 707 to the terminal R of the first U-phase latch circuit 708 in the inverted state. After receiving the inverted U-phase PWM signal $U_{P0}$ from the first U-phase NOT circuit 707 and the inverted U-phase blocking pulse $U_{P1}$ from the second U-phase latch circuit 711, the first U-phase latch circuit 708 transmits, according to the truth table in FIG. 4, a signal in which the rising is delayed by just T1 of the time width, that is, the circuit transmits to the U-phase high-side output terminal 704 an output signal in which the rising of the U-phase PWM signal $U_{P0}$ as represented in FIG. 15 is blocked for the period just during the U-phase blocking pulse $U_{P1}$ being "H".

Moreover, regarding the V-phase PWM signal $V_{P0}$ having been introduced inside the circuit, a portion of the signal is transmitted into the V-phase one-shot pulse generating circuit 716. The V-phase one-shot pulse generating circuit 716, in synch with the rising, generates a V-phase blocking pulse $V_{P1}$ having the predetermined time width T2 as represented in FIG. 15; then, the V-phase blocking pulse $V_{P1}$ is transmitted through the second V-phase NOT circuit 717 to the terminal R of the second V-phase latch circuit 718 in the inverted state. T2 has been set at 1.0 µs in this example. Then, through similar processing, the V-phase PWM signal $V_{P0}$ becomes an output signal in which the rising of the V-phase PWM signal $V_{P0}$ as represented in FIG. 15 is blocked for the period just during the V-phase blocking pulse $V_{P1}$ being "H", and is transmitted from the V-phase high-side output terminal 705. Regarding the W-phase PWM signal $W_{P0}$ having been introduced inside the circuit, a portion of the signal is transmitted into the W-phase one-shot pulse generating circuit 723. The W-phase one-shot pulse generating circuit 723, in synch with the rising, generates a W-phase blocking pulse $W_{P1}$ having the predetermined time width T3 as represented in FIG. 15; then, the W-phase blocking pulse $W_{P1}$ is transmitted through the second W-phase NOT circuit 724 to the terminal R of the second W-phase latch circuit 725 in the inverted state. T3 has been set at 1.5 µs in this example. Then, through similar processing, the W-phase PWM signal $W_{P0}$ becomes an output signal in which the rising of the W-phase PWM signal $W_{P0}$ as represented in FIG. 15 is blocked for the period just during the W-phase blocking pulse $W_{P1}$ being "H", and is transmitted from the W-phase high-side output terminal 706. Here, because if any two of T1, T2, and T3 are equal, simultaneous switching cannot be prevented, the relationships T1≠T2, T2≠T3, T3≠T1 are needed as this example.

Next, as represented in the latter part of FIG. 15, a case is considered in which values of the V-phase PWM signal $V_{P0}$ and the W-phase PWM signal $W_{P0}$ simultaneously rise from "L" to "H" at time $t_2$, that is, the V-phase switching device and the W-phase switching device simultaneously switch on. Regarding the V-phase PWM signal $V_{P0}$ having been introduced inside the circuit, a portion of the signal is transmitted into the second one-shot pulse generating circuit 729. The second one-shot pulse generating circuit 729, in synch with the rising, generates a V-phase switching detection pulse having the time width of 0.5 µs, and supplies the pulse into the first AND circuit 731 and the second AND circuit 732. Similarly, regarding the W-phase PWM signal $W_{P0}$ having been introduced inside the circuit, a portion of the signal is transmitted into the third one-shot pulse generating circuit 730. The third one-shot pulse generating circuit 730, in synch with the rising, generates a W-phase switching detection pulse having the time width of 0.5 µs, and supplies the pulse into the second AND circuit 732 and the third AND circuit 733.

The first AND circuit 731 outputs the AND of the U-phase switching detection pulse and the V-phase switching detection pulse, that is, the circuit outputs the value "H", when both the U-phase switching detection pulse and the V-phase switching detection pulse are "H". Similarly, the second AND circuit 732 outputs the AND of the V-phase switching detection pulse and the W-phase switching detection pulse, that is, the circuit outputs the value "H", when both the V-phase switching detection pulse and the W-phase switching detection pulse are "H"; moreover, the third AND circuit 733 outputs the AND of the U-phase switching detection pulse and the W-phase switching detection pulse, that is, the circuit outputs the value "H", when both the U-phase switching detection pulse and the W-phase switching detection pulse-are "H". Therefore, as represented in the latter part of FIG. 15, when values of the V-phase PWM signal $V_{P0}$ and the W-phase PWM signal $W_{P0}$ simultaneously rise from "L" to "H", the first AND circuit 731 outputs the value "L", the second AND circuit 732 outputs the value "H", and the third AND circuit 733 outputs the value "L".

On the other hand, regarding the V-phase PWM signal $V_{P0}$ having been introduced inside the circuit, a portion of the signal is transmitted into the V-phase one-shot pulse generating circuit 716. The V-phase one-shot pulse generating circuit 716, in synch with the rising, generates a V-phase blocking pulse $V_{P1}$ having the predetermined time width T2 as represented in FIG. 15; then, the V-phase blocking pulse $V_{P1}$ is transmitted through the second V-phase NOT circuit 717 to the terminal R of the second V-phase latch circuit 718 in the inverted state. The V-phase OR circuit 719 outputs to the terminal S of the second V-phase latch circuit 718 the OR of the simultaneous-switching detection signals from the first AND circuit 731 and from the second AND circuit 732. Because the second V-phase latch circuit 718 receives these two signals and outputs a signal according to the truth table in FIG. 4, in this case, the circuit directly outputs the V-phase blocking pulse $V_{P1}$, through the third V-phase NOT circuit 720, in the state of the pulse being inverted thereby, to the terminal S of the first V-phase latch circuit 715. Moreover, regarding the V-phase PWM signal $V_{P0}$ having been introduced inside the circuit, a portion of the remaining signal is supplied through the first V-phase NOT circuit 714 to the terminal R of the first V-phase latch circuit 715 in the inverted state. After receiving the inverted V-phase PWM signal $V_{P0}$ from the first V-phase NOT circuit 714 and the inverted V-phase blocking pulse $V_{P1}$ from the second V-phase latch circuit 718, the first V-phase latch circuit 715 transmits, according to the truth table in FIG. 4, a signal whose rising is delayed by the time width of just T2, that is, the circuit transmits to the V-phase high-side output terminal 705 an output signal in which the rising of the V-phase PWM signal $V_{P0}$ as represented in FIG. 1.5 is blocked for the period just during the V-phase blocking pulse $V_{P1}$ being "H".

Similarly, regarding the W-phase PWM signal $W_{P0}$ having been introduced inside the circuit, a portion of the signal is transmitted into the W-phase one-shot pulse generating circuit 723. The W-phase one-shot pulse generating circuit 723, in synch with the rising, generates a W-phase blocking pulse $W_{P1}$ having the predetermined time width T3 as represented in FIG. 15; then, the W-phase blocking pulse $W_{P1}$ is transmitted through the second W-phase NOT circuit 724 to the terminal R of the second W-phase latch circuit 725 in the inverted state. Then, through similar processing, the W-phase PWM signal $W_{P0}$ becomes an output signal in which the rising of the W-phase PWM signal $W_{P0}$ as represented in FIG. 15 is blocked for the period just during the W-phase blocking pulse $W_{P1}$ being "H", and is transmitted from the W-phase high-side output terminal 706.

Regarding the U-phase PWM signal $U_{P0}$ having been introduced inside the circuit, a portion of the signal is transmitted into the U-phase one-shot pulse generating circuit 709. The U-phase one-shot pulse generating circuit 709, in synch with the rising, generates a U-phase blocking pulse $U_{P1}$ having the predetermined time width T1 as represented in FIG. 15; then, the U-phase blocking pulse $U_{P1}$ is transmitted through the second U-phase NOT circuit 710 to the terminal R of the second U-phase latch circuit 711 in the inverted state. The U-phase OR circuit 712 outputs to the terminal S of the second U-phase latch circuit 711 the OR of the simultaneous-switching detection signals from the first AND circuit 731 and from the third AND circuit 733. Because the second U-phase latch circuit 711 receives these two signals, and outputs a signal according to the truth table in FIG. 4, in this case, the circuit blocks the U-phase blocking pulse $U_{P1}$, then outputs the value "L", through the third U-phase NOT circuit 713, in the state of the pulse being inverted thereby, to the terminal S of the first U-phase latch circuit 708. Moreover, regarding the U-phase PWM signal $U_{P0}$ having been introduced inside the circuit, a portion of the remaining signal is supplied through the first U-phase NOT circuit 707, being inverted thereby, to the terminal R of the first U-phase latch circuit 708. After receiving the inverted U-phase PWM signal $U_{P0}$ from the first U-phase NOT circuit 707 and the inverted U-phase blocking pulse $U_{P1}$ from the second U-phase latch circuit 711, the first U-phase latch circuit 708, according to the truth table in FIG. 4, outputs a signal; in this case, as represented in FIG. 15 the circuit directly outputs to the U-phase high-side output terminal 704 the U-phase PWM signal $U_{P0}$ in which the value remains "L".

Based on FIG. 15, the operations in the two cases of this example have been explained; in both the cases, because a time difference has been provided for switching timing between two phases or between any two phases out of three phases by delaying the switch-on time, the two-phase or three-phase simultaneous switching is prevented; consequently, it is found that the two or three phases switch on each other with a time interval of at least 0.5 µs. Moreover, in the latter part of the above operational explanation, a case of the V-phase and W-phase simultaneous switching has been represented as an example, because the configuration of each-phase signal-processing portion is equivalent, it is needless to say that similar operations are also realized in cases of the other simultaneous switching. Further conceptually explaining the operation in this embodiment, each-phase input signal is transmitted into a simultaneous-switching detection means, then the simultaneous-switching detection means detects that the input signals to one phase and the other phases simultaneously rise within a predetermined forbidden period, and then outputs the detected signals. The blocking signal generating means of each phase, when an input signal thereof rises from "L" to "H", generates, in synch with the rising, a blocking pulse having a predetermined time width (blocking period); then, after receiving the above plural detection signals, and obtaining the OR, in a case in which any one of the plurality of detection signals is "H", the means directly outputs the above blocking pulse as a blocking signal, meanwhile in the other cases, the means blocks the above blocking pulse. Here, if necessary, a blocking signal may be outputted, being inverted as in this embodiment, to the next signal-blocking means. In this case, the blocking period corresponds to a period during which the value of the blocking signal is "L". Moreover, in each phase, by the signal blocking means, based on the blocking signal from the blocking-signal generating means, an output signal in which the rising of each-phase input signal has been blocked for only the blocking period is outputted to the output terminal thereof. The above explanation is the summary for the operation of preventing the simultaneous switching in this embodiment.

Because this embodiment has been configured as described above, multi-phase simultaneous switching can be prevented similarly to that in Embodiment 1; thereby, not only surge voltage occurring, as the result of a switching device operation, across the terminals thereof, but also its switching loss can be reduced. Moreover, because a time difference to be determined as simultaneous switching is limited not longer than 0.5 µs, needless switching delay never occurs in any switching having a time difference that exceeds 0.5 µs.

Figure 16:
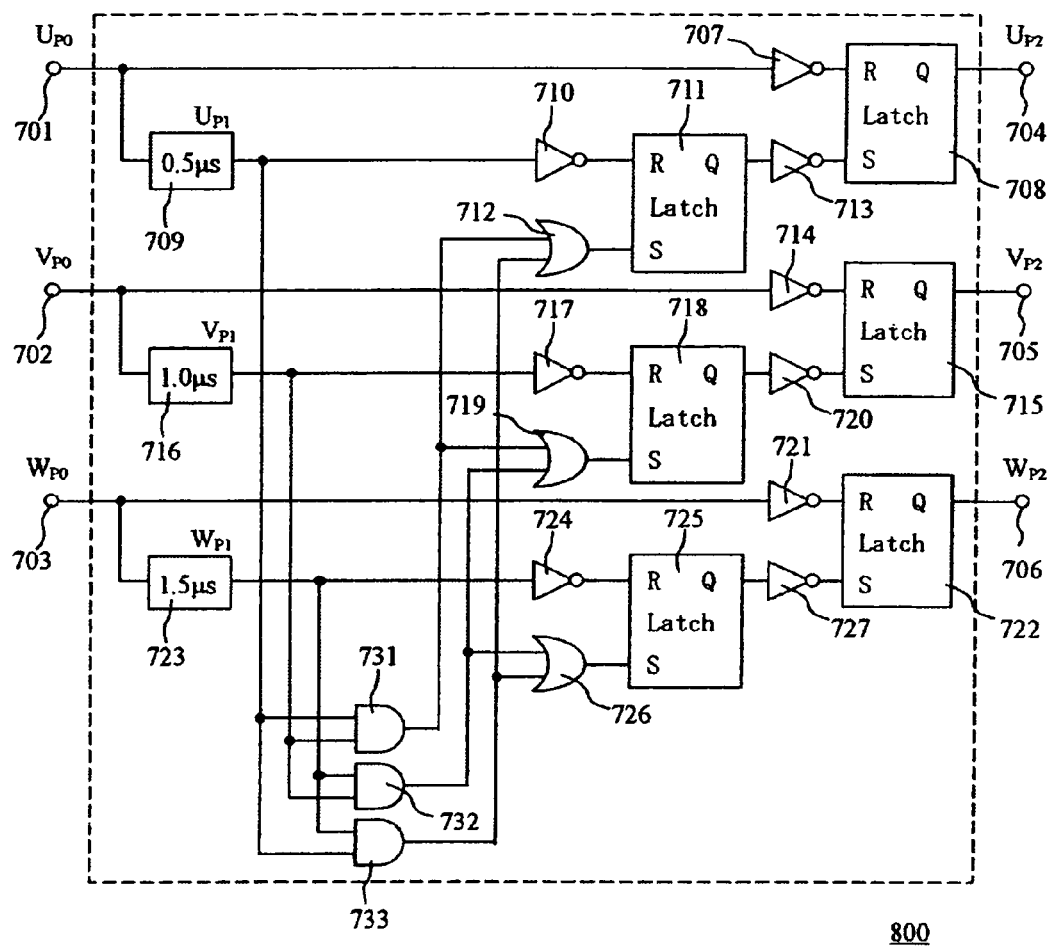
FIG. 16 is a circuit diagram illustrating a simultaneous-switching prevention circuit of Example 2 in Embodiment 2 according to the present invention.

The above idea for preventing the simultaneous switching in Embodiment 2 can be also realized in a simultaneous-switching prevention circuit of Example 2, as illustrated in FIG. 16, in Embodiment 2 according to the present invention. Because the same numerals in FIG. 16 denote the same elements as in FIG. 14, the explanation is omitted, the different points from those in FIG. 14 are as follows: the first one-shot pulse generating circuit 728, the second one-shot pulse generating circuit 729, and the third one-shot pulse generating circuit 730 are omitted; then, the lines connected from the first one-shot pulse generating circuit 728 to the first AND circuit 731 and the third AND circuit 733 are replaced with lines connected from the U-phase one-shot pulse generating circuit 709, the lines connected from the second one-shot pulse generating circuit 729 to the first AND circuit 731 and the second AND circuit 732 are replaced with lines connected from the V-phase one-shot pulse generating circuit 716, and the lines connected from the third one-shot pulse generating circuit 730 to the second AND circuit 732 and the third AND circuit 733 are replaced with lines connected from the W-phase one-shot pulse generating circuit 723. That is, the U-phase switching detection pulse supplied by the first one-shot pulse generating circuit 728 is replaced with the U-phase blocking pulse $U_{P1}$ supplied by the U-phase one-shot pulse generating circuit 709, the V-phase switching detection pulse supplied by the second one-shot pulse generating circuit 729 is replaced with the V-phase blocking pulse $V_{P1}$ supplied by the V-phase one-shot pulse generating circuit 716, and the W-phase switching detection pulse supplied by the third one-shot pulse generating circuit 730 is replaced with the W-phase blocking pulse $W_{P1}$ supplied by the W-phase one-shot pulse generating circuit 723. It may be easily understood that the simultaneous-switching prevention function of the circuit configured as described above is equivalent to that of the example represented in FIG. 14, and that needless switching delay may probably occur in a switching operation having a time difference that exceeds 0.5 μs. Moreover, comparing this to the example in FIG. 14, the first one-shot pulse generating circuit 728, the second one-shot pulse generating circuit 729, and the third one-shot pulse generating circuit 730 become needless; consequently, the circuit configuration has an advantage in that it can be simplified.

Embodiment 3

Figure 17:
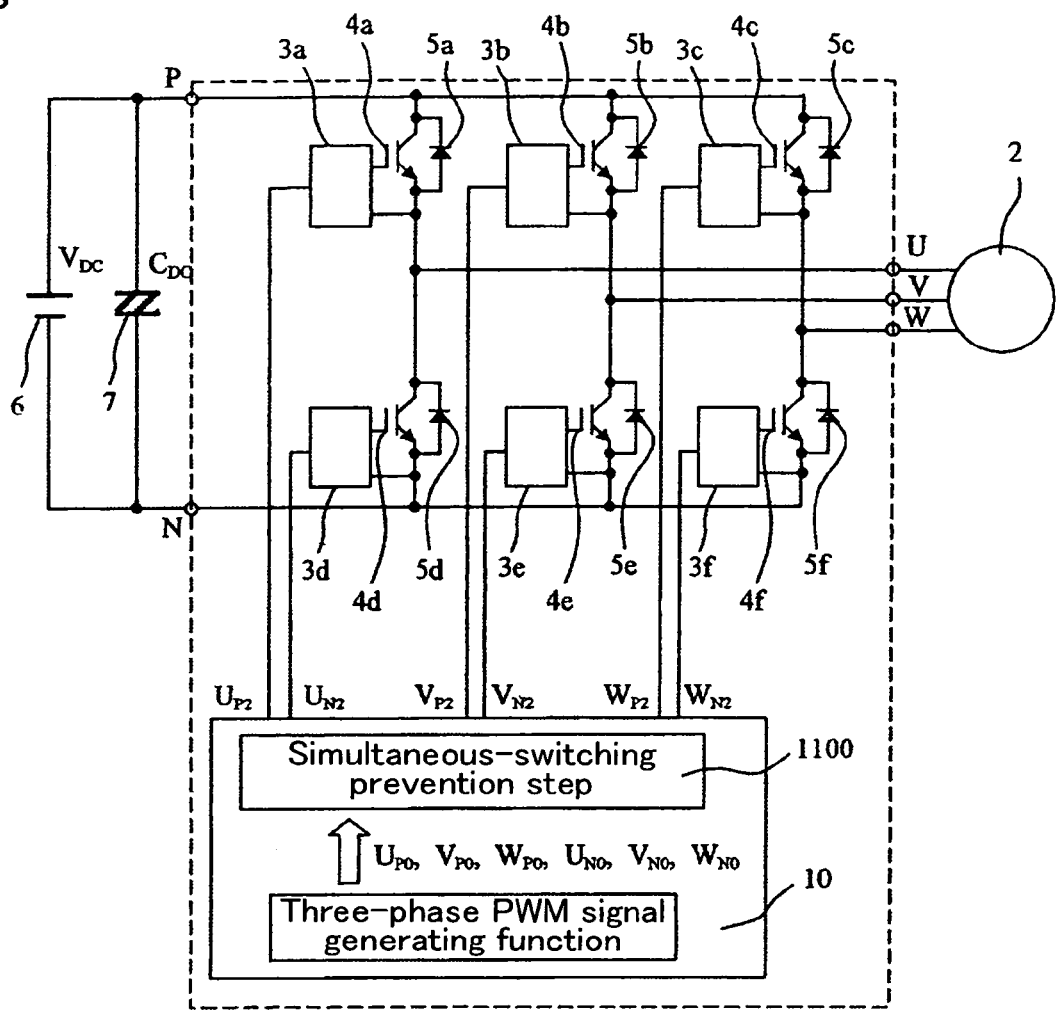
FIG. 17 is a circuit block diagram illustrating a configuration of a PWM inverter in Embodiment 3 according to the present invention.

As described above, in Embodiment 1 and Embodiment 2, the simultaneous-switching prevention function has been realized using a wired logic system; however, a similar function can also be realized by software. FIG. 17 illustrates a PWM inverter of Example 1 in Embodiment 3 according to the present invention, which differs from that in FIG. 1 on the point that a simultaneous-switching prevention step 1100 using software is provided in a main control unit 10 having a three-phase PWM signal generating function. Such simultaneous-switching prevention step 1100 is performed by a microcomputer, etc. built in the main control unit. Moreover, a timer is built in the microcomputer, and the values are stored in a predetermined register. The simultaneous-switching prevention step 1100 is to realize, by software, the concept of the simultaneous-switching prevention in Embodiment 1 having been realized using the wired logic system, and includes the following five steps. That is, in the first step, blocking parameters provided for each of controlling signals applied to a plurality of phases, outputted from the PWM-signal generating circuit, and the timer are initialized. In the second step, each controlling signal applied to the plurality of phases is inputted as a binary input signal, in such a way that a value "1" is inputted when the controlling signal is "H", while a value "0" when the controlling signal is "L". In the third step, each input signal applied to the plurality of phases is determined. In the fourth step, if the input-signal determination of each phase is "0" in the third step, the output signal of the related phase is made to be "0". In the fifth step, if the input-signal of each phase is determined "1" in the third step, the value of the blocking parameter of the related phase is made to be "1" for a predetermined period (blocking period); then, the OR of the blocking parameter of the other phases is determined, and if this value is "0", the output signal of the related phase is made to be "1". Hereinafter, the simultaneous-switching prevention step 1100 is explained in detail referring to a flow chart of Example 1 in FIG. 18.

Figure 18:
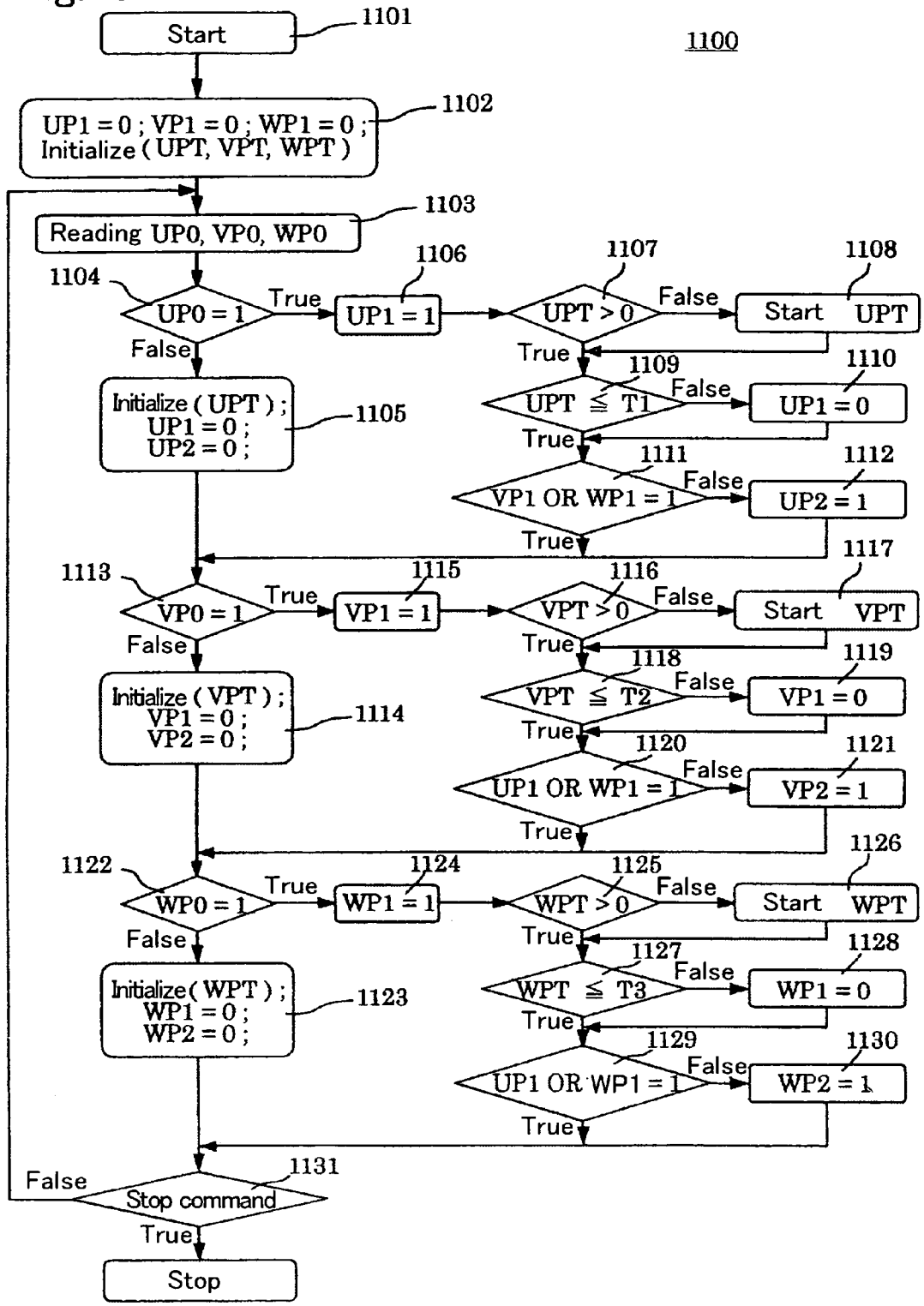
FIG. 18 is a flowchart representing an operation of a simultaneous-switching prevention circuit of Example 1 in Embodiment 3 according to the present invention.

In FIG. 18, a flowchart for processing a high-side controlling signal is represented; however, a flowchart for processing a low-side controlling signal is omitted because of the similarity to the high-side one. First, in Step 1101, Step 1100 is started by an external driving command such as switching on the power supply. Next, Step 1102 as the first step is performed; here, the blocking parameter and the timer used in the simultaneous-switching prevention step 1100 are initialized. Because three-phases including U-phase, V-phase, and W-phase are used in this example, an initial value of "0" is stored in each of blocking parameters UP1, VP1, and WP1. Timers UPT, VPT, and WPT are initialized; then, each register value is set at "0". Next, Step 1103 as the second step is performed; here, a U-phase PWM signal $U_{P0}$, a V-phase PWM signal $V_{P0}$, and a W-phase PWM signal $W_{P0}$ are respectively read into registers UP0, VP0, and WP0 in the microcomputer; thus, if the controlling signal of each phase at this moment is "H", the value is set at "1", while if the signal is "L", the value is set at "0".

Steps from the third to the fifth are performed for each of the U phase, the V phase and the W phase; first, processing regarding the U phase is explained. In Step 1104 as the third step, determination is performed at first, as to whether the value of the register UP0 among the controlling signals having been read in Step 1103 is "1"; then, if the result is false, Step 1105 as the forth step is performed, while if the result is true, Step 1106 and the following steps are performed as the fifth step. In Step 1105, the timer UPT and the blocking parameter UP1 are initialized, and the value "0" is outputted to a high-side U-phase output-signal port UP2 of the microcomputer. Due to this output, the main control unit 10 supplies to the driving circuit the U-phase output signal $U_{P2}$ having the value "L" from the U-phase high-side output terminal. In Step 1106, the value "1" is set into the blocking parameter UP1. In Step 1107, determination is performed as to whether the value of the register in the timer UPT is larger than "0"; then, if the result is true, Step 1109 ensues, while if the result is false, Step 1109 ensues after Step 1108 has been completed. In Step 1108, the timer UPT is started to be driven. In Step 1109, determination is performed as to whether the value of the register in the timer UPT is not longer than the predetermined time T1; then, if the result is true, Step 1111 ensues, while if the result is false, Step 1111 ensues after Step 1110 has been completed. In Step 1110, the value "0" is set into the blocking parameter UP1. That is, from Step 1106 to Step 1110 present steps in which the value of the blocking parameter UP1 is held at "1" for the blocking period T1. T1 is a period for requesting the prevention of the other phases from switching-on; thus, T1 has been set at 0.5 μs in this example. In Step 1111, determination is performed as to whether the OR of the blocking parameters VP1 and WP1 is "1"; then, if the result is true, Step 1113 ensues, while if the result is false, Step 1113 ensues after Step 1112 has been completed. In Step 1112, the value "1" is outputted to the high-side U-phase output signal port UP2 of the microcomputer. Due to this output, the main control unit 10 supplies to the driving circuit the U-phase output signal $U_{P2}$ having the value "H" from the U-phase high-side output terminal. Step 1106 to Step 1112 configure the fifth step; here, when the value of the register UP0 becomes "1", by setting the blocking parameter UP1 at "1" in the blocking period, the prevention of switching-on is requested to the other phases, and the prevention of switching-on for its own phase is performed by determining the OR of the blocking parameters VP1 and WP1, in response to the switch-on preventing request from the other phases.

Next, steps regarding the V phase are similarly performed. In Step 1113 as the third step, determination is performed as to whether the value of the register VP0 among the controlling signals having been read in Step 1103 is "1"; then, if the result is false, Step 1114 as the forth step is performed, while if the result is true, Step 1115 and the following steps, which is the fifth step, are performed In Step 1114, the timer VPT and the blocking parameter VP1 are initialized, and the value "0" is outputted to a high-side V-phase output-signal port VP2 of the microcomputer. Due to this output, the main control unit 10 supplies to the driving circuit the V-phase output signal $V_{P2}$ having the value "L" from the V-phase high-side output terminal. In Step 1115, the value "1" is set into the blocking parameter VP1. In Step 1116, determination is performed as to whether the value of the register in the timer VPT is larger than "0"; then, if the result is true, Step 1118 ensues, while if the result is false, Step 1118 ensues after Step 1117 has been completed. In Step 1117, the timer VPT is started to be driven. In Step 1118, determination is performed as to whether the value of the register in the timer VPT is not longer than the predetermined time T2; then, if the result is true, Step 1120 ensues, while if the result is false, Step 1120 ensues after Step 1119 has been completed. In Step 1119, the value "0" is set into the blocking parameter VP1. T2 is a period for requesting the switching-on prevention against the other phases; thus, T2 has been set at 1.0 μs in this example. In Step 1120, determination is performed as to whether the OR of the blocking parameters UP1 and WP1 is "1"; then, if the result is true, Step 1122 ensues, while if the result is false, Step 1122 ensues after Step 1121 has been completed. In Step 1121, the value "1" is outputted to the high-side V-phase output signal port VP2 of the microcomputer. Due to this output, the main control unit 10 supplies to the driving circuit the V-phase output signal $V_{P2}$ having the value "H" from the V-phase high-side output terminal. From Step 1115 to Step 1121 similarly configure the fifth step.

Next, steps regarding the W phase are similarly performed. In Step 1122 as the third step, determination is performed as to whether the value of the register WP0 among the controlling signals having been read in Step 1103 is "1"; then, if the result is false, Step 1123 as the forth step is performed, while if the result is true, as the fifth step, Step 1124 and the following steps are performed. In Step 1123, the timer WPT and the blocking parameter WP1 are initialized, and the value "0" is outputted to a high-side W-phase output-signal port WP2 of the microcomputer. Due to this output, the main control unit 10 supplies to the driving circuit the W-phase output signal $W_{P2}$ having the value "L" from the W-phase high-side output terminal. In Step 1124, the value "1" is set into the blocking parameter WP1. In Step 1125, determination is performed as to whether the value of the register in the timer WPT is larger than "0"; then, if the result is true, Step 1127 ensues, while if the result is false, Step 1127 ensues after Step 1126 has been completed. In Step 1126, the timer WPT is started to be driven. In Step 1127, determination is performed as to whether the value of the register in the timer WPT is not longer than the predetermined time T3; then, if the result is true, Step 1129 ensues, while if the result is false, Step 1129 ensues after Step 1128 has been completed. In Step 1128, the value "0" is set into the blocking parameter WP1. T3 is a period for requesting the prevention of the other phases switching-on; thus, T3 has been set at 1.5 μs in this example. In Step 1129, determination is performed as to whether the OR of the blocking parameters UP1 and VP1 is "1"; then, if the result is true, Step 1131 ensues, while if the result is false, Step 1131 ensues after Step 1130 has been completed. In Step 1130, the value "1" is outputted to the high-side W-phase output signal port WP2 of the microcomputer. Due to this output, the main control unit 10 supplies to the driving circuit the W-phase output signal $W_{P2}$ having the value "H" from the W-phase high-side output terminal. The steps from 1124 to 1130 similarly configure the fifth step.

After the steps from the third to the fifth with respect to each of the U phase, V phase, and W phase have been performed as described above, in Step 1131, determination is performed as to whether a stop command has been received from the exterior; then if the result is true, the simultaneous-switching prevention step 1100 is stopped; meanwhile, if the result is false, Step 1103 recurs, and the steps from 1103 to 1131 are repeated again. By repeating such steps from 1103 to 1131, variations of the U-phase PWM signal $U_{P0}$, the V-phase PWM signal $V_{P0}$, and the W-phase PWM signal $W_{P0}$ are read out; corresponding to the results, the switching-on prevention is requested against the other phases for the predetermined period; moreover, the determination is performed as to whether the switching-on prevention is requested from a plurality of the other phases; then, if there is a request, the rising time of the one-phase PWM signal is delayed by either of the other-phase blocking periods whichever longer; consequently, the simultaneous switching is prevented. The concept of the simultaneous-switching prevention in Embodiment 1 has been realized by software; therefore, it is needless to say that similar effects are demonstrated; moreover, because the simultaneous-switching prevention function has been realized by the software, by executing a function, together with other functions such as a PWM signal generating function, using one microcomputer, the controlling unit can be simplified, and additionally the blocking periods, etc. can be varied later by a program; therefore, the system becomes easy to apply to various applications.

Because in Example 1 of Embodiment 3 described above, the function in Example 1 of Embodiment 1 has been realized by software, the system effectively functions in response to a PWM signal formed by a triangular carrier wave; however, the system has a problem similar to that in Example 1 of Embodiment 1, for a PWM signal formed by a sawtooth carrier wave. That is, in a case in which the U-phase PWM signal $U_{P0}$, the V-phase PWM signal $V_{P0}$, and the W-phase PWM signal $W_{P0}$ simultaneously have risen (three-phase simultaneous switching), because the blocking period of the U-phase PWM signal $U_{P0}$ becomes T3, the blocking period of the V-phase PWM signal $V_{P0}$ becomes T3, and the blocking period of the W-phase PWM signal $W_{P0}$ becomes T2, the simultaneous switching of the switching device cannot be completely prevented. Therefore, in order to cope with this problem, it is necessary that the simultaneous-switching prevention function in Example 5 of Embodiment 1 should be realized by software; thus, the simultaneous-switching prevention step is represented by the flowchart in FIG. 19.

Figure 19:
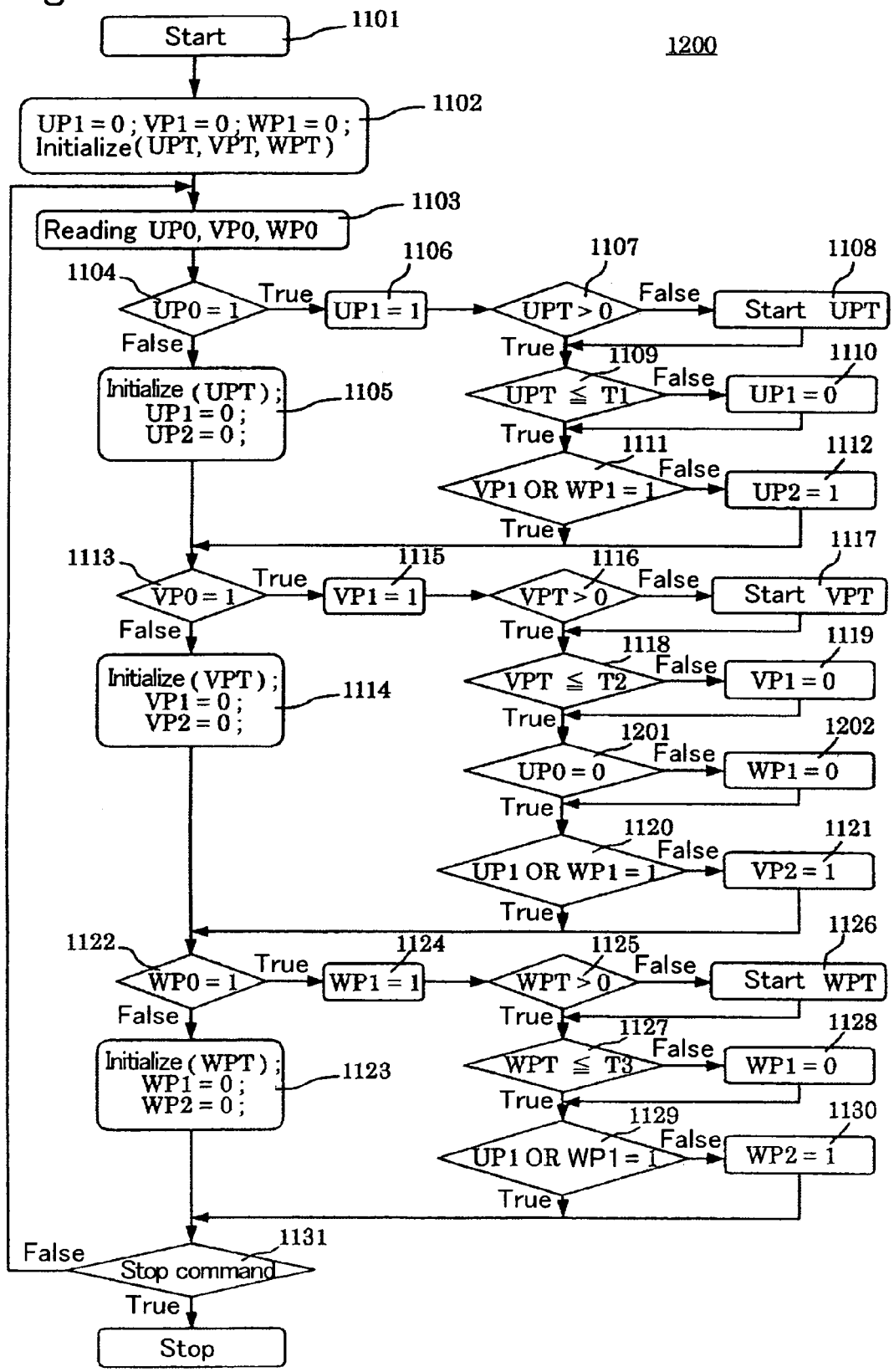
FIG. 19 is a flowchart representing an operation of a simultaneous-switching prevention circuit of Example 2 in Embodiment 3 according to the present invention.

FIG. 19 represents a simultaneous-switching prevention step 1200 used in Example 2 of a PWM inverter according to Embodiment 3 of the present invention; here, because in FIG. 19 the same numerals as those in FIG. 18 represents the same steps, their explanations are omitted, it differs from the simultaneous-switching prevention step 1100 in FIG. 18 on the point that a blocking-parameter prevention substep composed of Step 1201 and Step 1202 is inserted before Step 1120. That is, after Step 1118 or Step 1119 has been completed, Step 1201 ensues. In Step 1201, determination is performed as to whether the value of the register $U_{P0}$ is "0";

then, if the result is true, Step 1120 ensues, while if the result is false, Step 1120 ensues after Step 1202 is completed. In Step 1202, the value "0" is set to the blocking parameter WP1. Accordingly, the blocking-parameter prevention substep has a function that initializes the value of the blocking parameter WP1 when the U-phase PWM signal $U_{P0}$ becomes "H", and holds the value of the blocking parameter WP1 when the U-phase PWM signal $U_{P0}$ becomes "L"; therefore, because the U-phase PWM signal $U_{P0}$ becomes "H" in a case of the three-phase simultaneous switching, the value of the blocking parameter WP1 is initialized to become "0", and the blocking period of the V-phase PWM signal $V_{P0}$ becomes T1. At this moment, the value of the blocking parameter WP1 is once initialized, and becomes "0"; immediately after this however, because the value "1" is set in Step 1124 of the fifth step for the W phase, the effect of the initialization stays within the fifth step for the V phase; thus, steps of processing the other-phases are not affected. Therefore, at this moment, the blocking period of the U-phase PWM signal $U_{P0}$ becomes T3, while the blocking period of the W-phase PWM signal $W_{P0}$ becomes T2; consequently, it is found that the three-phase simultaneous switching is prevented. Moreover, in a case of the two-phase simultaneous switching of the V phase and the W phase, because the U-phase PWM signal $U_{P0}$ becomes "L", the value of the blocking parameter WP1 is held; the blocking period of the V-phase PWM signal $V_{P0}$ becomes T3, and the blocking period of the W-phase PWM signal $W_{P0}$ becomes T2; it is found that the two-phase simultaneous switching is prevented. As described above, it may be understood that the simultaneous-switching prevention step in this example in which the blocking-parameter prevention substep is added can prevent not only two-phase simultaneous switching but three-phase simultaneous switching.

As described above, based on each example, Embodiment 1, Embodiment 2, and Embodiment 3 according to the present invention have been explained. Although every example relates to three-phase PWM inverters, it is needless to say that each embodiment according to the present invention can be also applied to multi-phase PWM inverters. Moreover, in each example, a case in which the switching device switches into the on-state when each PWM signal transmitted from the PWM signal generating circuit to each gate driving circuit is "H", that is, a case of positive logic has been explained; in a case in which the switching device switches into the on-state when each PWM signal transmitted from the PWM signal generating circuit to each gate driving circuit is "L", that is, in a case of negative logic, the system may be suitably modified so that each means responds to the falling of the input signal; consequently, it may be easily understood that the concept of the present invention can also be applied to such negative logic cases.

What is claimed is:

1. A multi-phase simultaneous-switching prevention circuit comprising:
    a plurality of input means each for taking in, as an input signal, one of multi-phase control signals outputted from a PWM signal generating circuit;
    blocking pulse generating means each for generating a blocking pulse, for a predetermined period, in synch with the rising or the falling of the input signal of one phase, in order to block the rising or the falling of the input signals of the other phases;
    blocking signal forming means each for outputting a blocking signal whose blocking period is made to be the width of a pulse formed by the logical sum of a plurality of the other-phase blocking pulses from the blocking pulse generating means;
    signal blocking means each for receiving the input signal of the one phase, and outputting a signal whose rising or falling is delayed until the end of the blocking period; and
    a plurality of output means each for outputting to the exterior of the prevention circuit the output signal from the signal blocking means.

2. A multi-phase simultaneous-switching prevention circuit as recited in claim 1, wherein the blocking signal forming means, after receiving an inverted input signal of the one phase and a plurality of the other-phase blocking pulses from the blocking pulse generating means, is connected in order to output the inverted signals of the logical sum of the input signal and said plurality of the blocking pulses.

3. A PWM inverter comprising:
    a gate driving circuit; and
    a PWM signal generating circuit; wherein
    the multi-phase simultaneous-switching prevention circuit as recited in claims 2 is inserted between the gate driving circuit and the PWM signal generating circuit.

4. A multi-phase simultaneous-switching prevention circuit as recited in claim 1, wherein:
    the control signals outputted from the PWM signal generating circuit are in three phases including U-phase, V-phase, and W-phase;
    the blocking pulse generating means comprises:
        a U-phase one-shot pulse generating circuit connected in order to output, in synch with the rising or falling of a U-phase input signal, a U-phase blocking pulse having a predetermined time width T1,
        a V-phase one-shot pulse generating circuit connected in order to output, in synch with the rising or falling of a V-phase input signal, a V-phase blocking pulse having a predetermined time width T2, and
        a W-phase one-shot pulse generating circuit connected in order to output, in synch with the rising or falling of a W-phase input signal, a W-phase blocking pulse having a predetermined time width T3;
    the blocking signal forming means comprises:
        a U-phase NOR circuit connected in order to receive the V-phase blocking pulse and the W-phase blocking pulse, and to output the inverted signal of the logical sum of both the pulses,
        a V-phase NOR circuit connected in order to receive the W-phase blocking pulse and the U-phase blocking pulse, and to output the inverted signal of the logical sum of both the pulses, and
        a W-phase NOR circuit connected in order to receive the U-phase blocking pulse and the V-phase blocking pulse, and to output the inverted signal of the logical sum of both the pulses;
    the signal blocking means comprises:
        a U-phase NOT circuit connected in order to receive a U-phase input signal, and to output its inverted signal,
        a U-phase latch circuit, having at least three terminals including an S-terminal, an R-terminal, and a Q-terminal, connected in such a way that the output signal from the U-phase NOT circuit is inputted to the R-terminal, meanwhile the output signal from the U-phase NOR circuit is inputted to the S-terminal, in order to output to the Q-terminal an output signal,
        a V-phase NOT circuit connected in order to receive a V-phase input signal, and to output its inverted signal,
a V-phase latch circuit, having at least three terminals including an S-terminal, an R-terminal, and a Q-terminal, connected in such a way that the output signal from the V-phase NOT circuit is inputted to the R-terminal, meanwhile the output signal from the V-phase NOR circuit is inputted to the S-terminal, in order to output to the Q-terminal an output signal,
a W-phase NOT circuit connected in order to receive a W-phase input signal, and to output its inverted signal, and
a W-phase latch circuit, having at least three terminals including an S-terminal, an R-terminal, and a Q-terminal, connected in such a way that the output signal from the W-phase NOT circuit is inputted to the R-terminal, meanwhile the output signal from the W-phase NOR circuit is inputted to the S-terminal, and connected in order to output to the Q-terminal an output signal; and
the time widths T1, T2, and T3 are different from each other.

5. A multi-phase simultaneous-switching prevention circuit as recited in claim 4, wherein the blocking signal forming means, after receiving an inverted input signal of the one phase and a plurality of the other-phase blocking pulses from the blocking pulse generating means, is connected in order to output the inverted signals of the logical sum of the input signal and said plurality of the blocking pulses.

6. A multi-phase simultaneous-switching prevention circuit as recited in claim 5, further comprising:
a blocking-pulse prevention circuit provided to be inserted between the W-phase one-shot pulse generating circuit and the V-phase NOR circuit; wherein:
the time widths T1, T2, and T3 are set as T1<T2<T3; and
the blocking-pulse prevention circuit includes:
a NOT circuit connected in order to receive a U-phase input signal and to output its inverted signal, and
an AND circuit connected in order to receive output signals from the NOT circuit and from the W-phase one-shot pulse generating circuit, and to output to the V-phase NOR circuit a signal having been logically integrated in the AND circuit.

7. A PWM inverter comprising:
a gate driving circuit; and
a PWM signal generating circuit; wherein
the multi-phase simultaneous-switching prevention circuit as recited in claims 6 is inserted between the gate driving circuit and the PWM signal generating circuit.

8. A PWM inverter comprising:
a gate driving circuit; and
a PWM signal generating circuit; wherein
the multi-phase simultaneous-switching prevention circuit as recited in claims 5 is inserted between the gate driving circuit and the PWM signal generating circuit.

9. A multi-phase simultaneous-switching prevention circuit as recited in claim 4, further comprising:
a blocking-pulse prevention circuit provided to be inserted between the W-phase one-shot pulse generating circuit and the V-phase NOR circuit; wherein:
the time widths T1, T2, and T3 are set as T1<T2<T3; and
the blocking-pulse prevention circuit includes:
a NOT circuit connected in order to receive a U-phase input signal and to output its inverted signal, and
an AND circuit connected in order to receive output signals from the NOT circuit and from the W-phase one-shot pulse generating circuit, and to output to the V-phase NOR circuit a signal having been logically integrated in the AND circuit.

10. A PWM inverter comprising:
a gate driving circuit; and
a PWM signal generating circuit; wherein
the multi-phase simultaneous-switching prevention circuit as recited in claims 9 is inserted between the gate driving circuit and the PWM signal generating circuit.

11. A PWM inverter comprising:
a gate driving circuit; and
a PWM signal generating circuit; wherein
the multi-phase simultaneous-switching prevention circuit as recited in claims 4 is inserted between the gate driving circuit and the PWM signal generating circuit.

12. A PWM inverter comprising:
a gate driving circuit; and
a PWM signal generating circuit; wherein
the multi-phase simultaneous-switching prevention circuit as recited in claim 1 is inserted between the gate driving circuit and the PWM signal generating circuit.

13. A multi-phase simultaneous-switching prevention circuit comprising:
a plurality of input means each for taking in, as an input signal, one of multi-phase control signals outputted from a PWM signal generating circuit;
simultaneous-switching detection means each for detecting that an input signal of one phase and input signals of the other phases simultaneously rise or fall during a predetermined forbidden period, and for outputting the detection signal;
blocking signal generating means each for receiving the detection signal from the simultaneous-switching detection means, and outputting a blocking signal having a predetermined blocking period;
signal blocking means each for receiving the input signal of the one phase, outputting a signal whose rising or falling is delayed by the amount of the blocking period; and
a plurality of output means each for outputting to the exterior of the prevention circuit the output signal from the signal blocking means.

14. A multi-phase simultaneous-switching prevention circuit as recited in claim 13, wherein:
the control signals outputted from the PWM signal generating circuit are in three phases including U-phase, V-phase, and W-phase;
the simultaneous-switching detection means comprises:
a first one-shot pulse generating circuit connected in order to output, in synch with the rising or falling of a U-phase input signal, a pulse having a predetermined time width,
a second one-shot pulse generating circuit connected in order to output, in synch with the rising or falling of a V-phase input signal, a pulse having a predetermined time width,
a third one-shot pulse generating circuit connected in order to output, in synch with the rising or falling of a W-phase input signal, a pulse having a predetermined time width,
a first AND circuit connected in order to output, as a detection signal, the logically integrated signal of the signals outputted from the first and the second one-shot pulse generating circuits,
a second AND circuit connected in order to output, as a detection signal, the logically integrated signal of the signals outputted from the second and the third one-shot pulse generating circuits, and a third AND circuit connected in order to output, as a detection signal, the logically integrated signal of the signals outputted from the third and the first one-shot pulse generating circuits;

the blocking signal forming means comprises:
- a U-phase one-shot pulse generating circuit connected in order to generate, in synch with the rising or falling of a U-phase input signal, a U-phase blocking signal having a predetermined time width T1,
- a first U-phase NOT circuit connected in order to output the inverted signal of the U-phase blocking pulse,
- a U-phase OR circuit connected in order to output the logical sum of the detection signals outputted from the first and the third AND circuits,
- a V-phase one-shot pulse generating circuit connected in order to generate, in synch with the rising or falling of a V-phase input signal, a V-phase blocking signal having a predetermined time width T2,
- a first V-phase NOT circuit connected in order to output the inverted signal of the V-phase blocking pulse,
- a V-phase OR circuit connected in order to output the logical sum of the detection signals outputted from the first and the second AND circuits,
- a W-phase one-shot pulse generating circuit connected in order to generate, in synch with the rising or falling of a W-phase input signal, a W-phase blocking signal having a predetermined time width T3,
- a first W-phase NOT circuit connected in order to output the inverted signal of the W-phase blocking pulse,
- a W-phase OR circuit connected in order to output the logical sum of the detection signals outputted from the second and the third AND circuits, and
- a first one-phase latch circuit, provided corresponding to each phase, having at least three terminals including an S-terminal, an R-terminal, and a Q-terminal, connected in such a way that the output signal from the first one-phase NOT circuit is inputted to the R-terminal, while the output signal from the one-phase OR circuit is inputted to the S-terminal, and in order to output to the Q-terminal a one-phase blocking signal;

the signal blocking means provided corresponding to each phase comprises:
- a second one-phase NOT circuit connected in order to receive a one-phase input signal, and to output its inverted signal,
- a third one-phase NOT circuit connected in order to receive an output signal from the first one-phase latch circuit, and to output its inverted signal, and
- a second one-phase latch circuit, having at least three terminals including an S-terminal, an R-terminal, and a Q-terminal, connected in such a way that the output signal from the second one-phase NOT circuit is inputted to the R-terminal, while the output signal from the third one-phase NOT circuit is inputted to the S-terminal, in order to output to the Q-terminal an output signal; and said time widths T1, T2, and T3 are different from each other.

15. A PWM inverter comprising:
a gate driving circuit; and
a PWM signal generating circuit; wherein
the multi-phase simultaneous-switching prevention circuit as recited in claims 14 is inserted between the gate driving circuit and the PWM signal generating circuit.

16. A PWM inverter comprising:
a gate driving circuit; and
a PWM signal generating circuit; wherein
the multi-phase simultaneous-switching prevention circuit as recited in claims 13 is inserted between the gate driving circuit and the PWM signal generating circuit.

17. A driving method for an inverter used in a PWM inverter including a simultaneous-switching prevention method, and having a driving circuit corresponding to a main control unit and a plurality of phases, the method simultaneous-switching prevention comprising:
- a first step of initializing a blocking parameter provided for each of control signals, corresponding to the plurality of phases, outputted from a PWM signal generating circuit, and initializing a timer;
- a second step of inputting each of the control signals corresponding to said plurality of the phases, as a binary input signal composed of a first and a second values;
- a third step of determining the value of an input signal of one phase;
- a fourth step of outputting, if the value of the input signal in the determination of the third step is the second value, a signal to command switch-off the driving circuit corresponding to the one phase; and
- a fifth step of setting, if the value of the input signal in the determination of the third step is the first value, the value of the blocking parameter of the one phase to the first value during a predetermined period, and outputting, if every value of the blocking parameters of the other phases is the second value, a signal to command switch-on the driving circuit corresponding to the one phase.

18. A driving method for an inverter as recited in claim 17, wherein:
the plurality of phases are three phases including U-phase, V-phase, and W-phase;
the third step is performed in each of the three phases;
the fourth step is performed in each of the three phases;
the fifth step includes, with respect to the U phase,
- a substep of setting the value of a U-phase blocking parameter to the first value,
- a substep of starting a U-phase timer, unless the timer has been started,
- a substep of setting the value of the U-phase blocking parameter to the second value, unless the time of the U-phase timer is not more than a predetermined time T1, and
- a substep of outputting, if both the values of a V-phase blocking parameter and a W-phase blocking parameter are the second value, a signal to the driving circuit, corresponding to the U phase, to command switch-on, with respect to the V phase,
- a substep of setting the value of the V-phase blocking parameter to the first value,
- a substep of starting a V-phase timer, unless the timer has been started,
- a substep of setting the value of the V-phase blocking parameter to the second value, unless the time of the V-phase timer is not more than a predetermined time T2, and
- a substep of outputting, if both the values of the W-phase blocking parameter and the U-phase blocking parameter are the second value, a signal to the driving circuit, corresponding to the V phase, to command switch-on, and with respect to the W phase,
a substep of setting the value of the W-phase blocking parameter to the first value,
a substep of starting a W-phase timer, unless the timer has been started,
a substep of setting the value of the W-phase blocking parameter to the second value, unless the time of the W-phase timer is not more than a predetermined time T3, and
a substep of outputting, if both the values of the U-phase blocking parameter and the V-phase blocking parameter are the second value, a signal to the driving circuit, corresponding to the W phase, to command switch-on, and includes a sixth step of returning to the second step, unless any stop command is transmitted from the exterior; and the time widths T1, T2, and T3 are different from each other.

19. A driving method for an inverter as recited in claim 18, wherein:
the time widths T1, T2, and T3 are set as T1<T2<T3; and
the fifth step, with respect to the V phase, includes a controlling blocking-parameter substep of setting the W-phase blocking parameter to the second value, unless the value of the U-phase input signal is the second value.

* * * * *